US012777504B2

(12) United States Patent
Kim et al.

(10) Patent No.: US 12,777,504 B2
(45) Date of Patent: Oct. 27, 2026

(54) METHOD FOR CONTROLLING SIDELINK COMMUNICATION AND DEVICE THEREOF

(71) Applicant: IUCF-HYU (INDUSTRY-UNIVERSITY COOPERATION FOUNDATION HANYANG UNIVERSITY), Seoul (KR)

(72) Inventors: Sunwoo Kim, Seoul (KR); Jeongwan Kang, Seoul (KR); Hyeonjin Jung, Seoul (KR); Taekyoon Kim, Seoul (KR); Hyunwoo Park, Seoul (KR); Jaebok Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 653 days.

(21) Appl. No.: 18/249,725

(22) PCT Filed: Oct. 29, 2021

(86) PCT No.: PCT/KR2021/015445
§ 371 (c)(1),
(2) Date: Sep. 19, 2023

(87) PCT Pub. No.: WO2022/092898
PCT Pub. Date: May 5, 2022

(65) Prior Publication Data

US 2024/0224301 A1 Jul. 4, 2024

(30) Foreign Application Priority Data

Oct. 29, 2020 (KR) ........................ 10-2020-0141754
Nov. 6, 2020 (KR) ........................ 10-2020-0147379
Oct. 27, 2021 (KR) ........................ 10-2021-0144479

(51) Int. Cl.
*H04W 72/40* (2023.01)
*H04L 1/1812* (2023.01)
(Continued)

(52) U.S. Cl.
CPC ........... *H04W 72/40* (2023.01); *H04L 1/1812* (2013.01); *H04W 28/26* (2013.01); *H04W 72/25* (2023.01); *H04W 72/563* (2023.01)

(58) Field of Classification Search
CPC ... H04W 72/40; H04W 72/25; H04W 72/563; H04W 28/26; H04L 1/1812
See application file for complete search history.

(56) References Cited

U.S. PATENT DOCUMENTS

2017/0280469 A1 9/2017 Park et al.
2020/0106566 A1* 4/2020 Yeo ....................... H04L 1/1812
(Continued)

FOREIGN PATENT DOCUMENTS

KR 10-2017-0080609 A 7/2017
KR 10-2020-0078354 A 7/2020
(Continued)

OTHER PUBLICATIONS

International Search Report and Written Opinion of the Internal Search Authority issued in PCT Application No. PCT/KR2021/015445. Dated Feb. 9, 2022.

*Primary Examiner* — Won Tae C Kim

(57) ABSTRACT

The present disclosure relates to a method and device for providing a V2X service in a New RAT, and provides: a method for a terminal to control sidelink communication; and a device. The method comprises the steps of: receiving Sidelink Control Information from a second terminal; receiving first sidelink data according to the scheduling of the Sidelink Control Information; and, if the time resource
(Continued)

for transmitting first HARQ feedback information about first sidelink data at least partially overlaps with the time resource for transmitting second HARQ feedback information about second sidelink data transmitted by the terminal, determining the priorities of the time resources.

10 Claims, 15 Drawing Sheets

(51) Int. Cl.

| | |
|---|---|
| ***H04W 28/26*** | (2009.01) |
| ***H04W 72/25*** | (2023.01) |
| ***H04W 72/563*** | (2023.01) |

(56) References Cited

U.S. PATENT DOCUMENTS

| | | | | |
|---|---|---|---|---|
| 2020/0228247 | A1 | 7/2020 | Guo et al. | |
| 2023/0057836 | A1* | 2/2023 | Yeo | H04L 5/0055 |
| 2023/0247654 | A1* | 8/2023 | Zhang | H04W 72/40 370/329 |
| 2023/0262774 | A1* | 8/2023 | Wu | H04W 76/14 370/329 |

FOREIGN PATENT DOCUMENTS

| | | | |
|---|---|---|---|
| WO | 2020-024208 | A1 | 2/2020 |
| WO | 2020-093678 | A1 | 5/2020 |

* cited by examiner

METHOD FOR CONTROLLING SIDELINK COMMUNICATION AND DEVICE THEREOF

CROSS-REFERENCE TO RELATED APPLICATIONS

This application is a National Stage Entry of PCT International Application No. PCT/KR2021/015445, which was filed on Oct. 29, 2021, and which claims priority from and the benefit of Korean Patent Application No. 10-2020-0141754, filed with the Korean Intellectual Property Office on Oct. 29, 2020, Korean Patent Application No 10-2020-0147379, filed with the Korean Intellectual Property Office on Nov. 6, 2020, and Korean Patent Application No 10-2021-0144479, filed with the Korean Intellectual Property Office on Oct. 27, 2021, and all of which are hereby incorporated by reference for all purposes as if fully set forth herein. In addition, when this application also claims priority for countries other than the United States for the same reason as above, all of the contents of the above-listed applications are hereby incorporated by reference.

TECHNICAL FIELD

The disclosure relates to a method and device for providing a V2X service in a next-generation radio access technology (new RAT).

BACKGROUND ART

There is demand for large-capacity data processing, high-rate data processing, and various services using wireless terminals in vehicles and industrial sites. As described above, there is a need for a technology for a high-rate, large-capacity communication system capable of processing various scenarios and large-volume data, such as video, wireless data, and machine-type communication data, beyond a simple voice-oriented service.

To this end, the ITU-R discloses the requirements for adopting the IMT-2020 international standard, and there is being studied for next-generation wireless communication technology to meet the requirements of IMT-2020.

In particular, the 3GPP is conducting research on the LTE-advanced Pro Rel-15/16 standards and the new radio access technology (NR) standard in parallel to meet the requirements for IMT-2020 called 5G technology, and has a plan to approve the two standards as next-generation wireless communication technology.

5G technology may be applied and utilized in autonomous vehicles. For this, it is necessary to apply 5G technology to vehicle-to-everything (V2X) communication, and autonomous driving requires high-rate transmission and reception while guaranteeing high reliability for increasing data.

Further, to meet driving scenarios of various autonomous vehicles, such as platooning, it is required to ensure multicast data transmission/reception as well as unicast data transmission/reception using V2X communication.

As such, when a plurality of terminals perform sidelink communication using various communication types, there is a risk of collision of radio resources for sidelink communication. Further, frequent V2X communication may cause a collision in transmission and reception of HARQ feedback.

DETAILED DESCRIPTION OF THE INVENTION

Technical Problem

The present embodiments may provide a method and device for performing sidelink communication using next-generation radio access technology.

Technical Solution

In an aspect, the present embodiments provide a method for controlling sidelink communication by a UE, comprising receiving sidelink control information from a second UE, receiving first sidelink data according to scheduling of the sidelink control information, and determining priority when a time resource for transmitting first HARQ feedback information for the first sidelink data and a time resource for receiving second HARQ feedback information for second sidelink data transmitted by the UE at least partially overlap.

In another aspect, the present embodiments provide, in a method for controlling sidelink communication by a UE, the UE comprising a receiver receiving sidelink control information from a second UE and receiving first sidelink data according to scheduling of the sidelink control information and a controller determining priority when a time resource for transmitting first HARQ feedback information for the first sidelink data and a time resource for receiving second HARQ feedback information for second sidelink data transmitted by the UE at least partially overlap.

Advantageous Effects

According to the present embodiments, there may be provided a method and device for performing sidelink communication using next-generation radio access technology.

MODE FOR CARRYING OUT THE INVENTION

Figure 1:
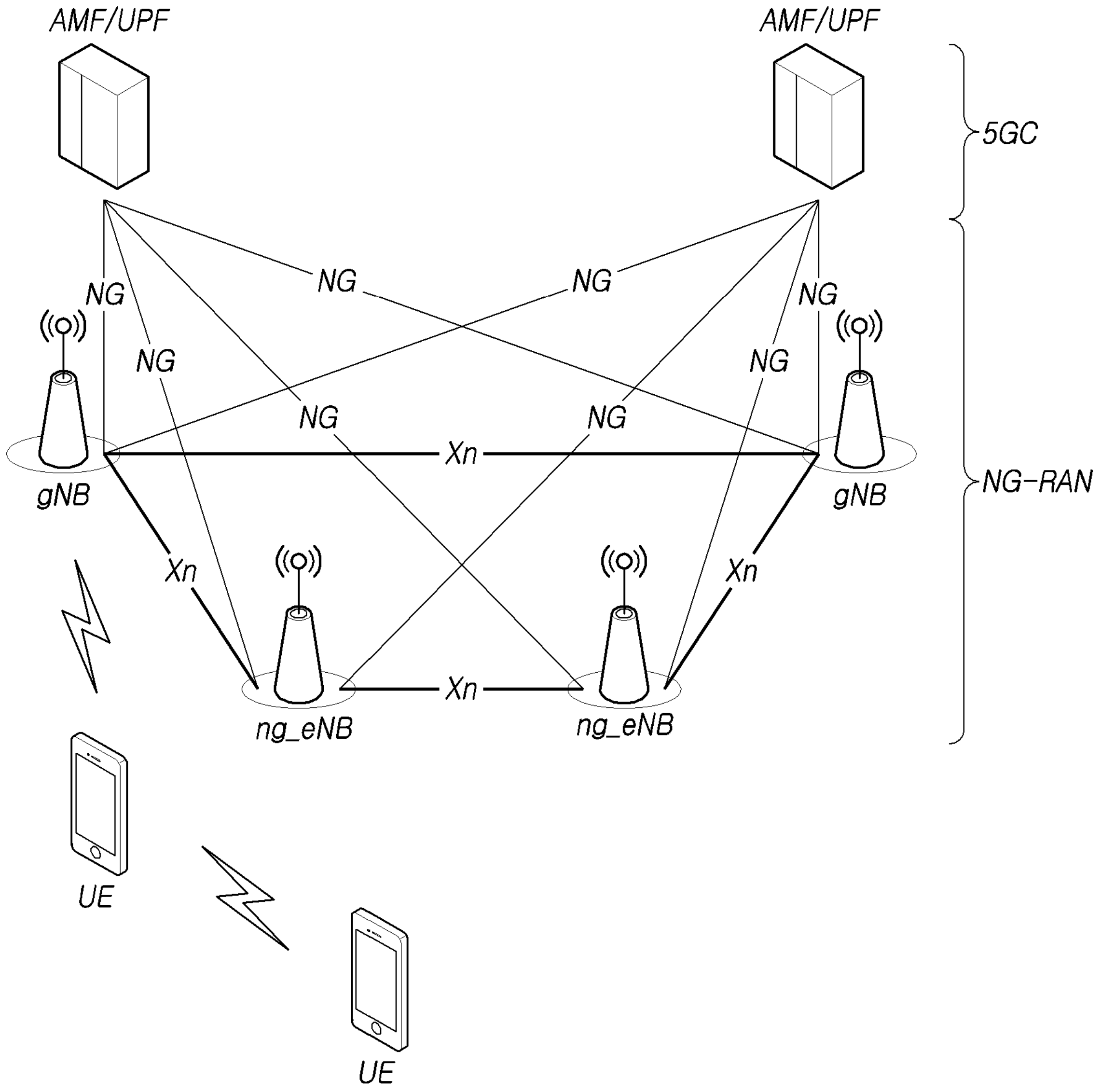
FIG. 1 is a view schematically illustrating a structure for an NR wireless communication system to which the present embodiments may apply.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a," "an," and "the" are intended to include the plural forms as well, unless the context clearly indicates otherwise.

Such denotations as "first," "second," "A," "B," "(a)," and "(b)," may be used in describing the components of the present invention. These denotations are provided merely to distinguish a component from another, and the essence, order, or number of the components are not limited by the denotations.

In describing the positional relationship between components, when two or more components are described as "connected", "coupled" or "linked", the two or more components may be directly "connected", "coupled" or "linked", or another component may intervene. Here, the other component may be included in one or more of the two or more components that are "connected", "coupled" or "linked" to each other.

When such terms as, e.g., "after", "next to", "after", and "before", are used to describe the temporal flow relationship related to components, operation methods, and fabricating methods, it may include a non-continuous relationship unless the term "immediately" or "directly" is used.

Meanwhile, if a numerical value or its corresponding information (e.g., level, etc.) is mentioned for a component, it may be interpreted that the numerical value or its corresponding information includes a margin of error that may be caused by various factors (e.g., process factors, internal or external shocks, noise, etc.), even if it is not explicitly stated otherwise.

In the disclosure, 'wireless communication system' means a system for providing various communication services, such as voice and data packets, using a radio resource and may include a UE, a base station, or a core network.

The present embodiments disclosed below may be applied to wireless communication systems using various radio access technologies. For example, the present embodiments may be applied to various radio access technologies, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). Further, radio access technology may mean not only a specific access technology, but also a communication technology for each generation established by various communication organizations, such as 3GPP, 3GPP2, Wi-Fi, Bluetooth, IEEE, and ITU. For example, CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented with a wireless technology, such as institute of electrical and electronic engineers (IEEE) 802.11 (Wi-Fi), IEEE 802.16 (WiMAX), IEEE 802-20, evolved UTRA (E-UTRA), and the like. IEEE 802.16m is an evolution of IEEE 802.16e, and provides backward compatibility with IEEE 802.16e-based systems. UTRA is part of UMTS (universal mobile telecommunications system). 3GPP (3rd generation partnership project) LTE (long term evolution) is part of E-UMTS (evolved UMTS) using evolved-UMTS terrestrial radio access (E-UTRA) and adopts OFDMA for downlink and SC-FDMA for uplink. As such, the present embodiments may be applied to currently disclosed or commercialized radio access technologies and may also be applied to radio access technologies currently under development or to be developed in the future.

Meanwhile, in the disclosure, 'UE' is a comprehensive concept meaning a device including a wireless communication module that communicates with a base station in a wireless communication system and should be interpreted as a concept that may include not only user equipment (UE) in, e.g., WCDMA, LTE, NR, HSPA, and IMT-2020 (5G or new radio), but also a mobile station (MS), user terminal (UT), subscriber station (SS), or wireless device in GSM. Further, the UE may be a user portable device, such as a smartphone, according to the usage type and, in the V2X communication system, the UE may mean a vehicle or a device including a wireless communication module in the vehicle. Further, in the case of a machine type communication system, the UE may mean an MTC terminal, M2M terminal, or URLLC terminal equipped with a communication module to perform machine type communication.

In the disclosure, 'base station' or 'cell' refers to a terminal that communicates with a UE in terms of a network and in concept encompasses various coverage areas, such as node-B, evolved node-B (eNB), gNode-B (gNB), low power node (LPN), sector, site, various types of antennas, base transceiver system (BTS), access point, point (e.g. transmission point, reception point, or transmission/reception point), relay node, mega cell, macro cell, micro cell, pico cell, femto cell, remote radio head (RRH), radio unit (RU), or small cell. Further, 'cell' may mean one including a bandwidth part (BWP) in the frequency domain. For example, 'serving cell' may mean the activation BWP of the UE.

Since there is a base station controlling one or more cells in the various cells enumerated above, the base station may be interpreted in two meanings. The base station may be 1) a device itself which provides a mega cell, a macro cell, a micro cell, a pico cell, a femto cell, or a small cell in relation to the radio region, or 2) the radio region itself. In 1), all devices that provide a predetermined radio region and are controlled by the same entity or interact to configure a radio region via cooperation are denoted as base stations. An embodiment of the base station is a transmission/reception point, transmission point, or reception point depending on the scheme of configuring the radio region. In 2), the radio region itself, in which a signal is received or transmitted from the point of view of the UE or a neighboring base station may be the base station.

In the disclosure, ‘cell’ may mean the coverage of the signal transmitted from the transmission/reception point, a component carrier having the coverage of the signal transmitted from the transmission/reception point (transmission point or transmission/reception point), or the transmission/reception point itself.

Uplink (UL) means a scheme for transmitting/receiving data to and from the base station by the UE, and downlink (DL) means a scheme for transmitting/receiving data to/from the UE by the base station. Downlink may mean communication or communication path from the multiple transmission/transmission points to the UE, and uplink may mean communication or communication path from the UE to the multiple transmission/reception points. In this case, in the downlink, the transmitter may be part of the multiple transmission/reception points, and the receiver may be part of the UE. Further, in the uplink, the transmitter may be part of the UE, and the receiver may be part of the multiple transmission/reception points.

Uplink and downlink transmits/receives control information through a control channel, such as physical downlink control channel (PDCCH) or physical uplink control channel (PUCCH) and configures a data channel, such as physical downlink shared channel (PDSCH) or physical uplink shared channel (PUSCH) to transmit/receive data. Hereinafter, the context in which signals are transmitted/received through a channel, such as PUCCH, PUSCH, PDCCH, and PDSCH, is expressed as ‘transmitting or receiving PUCCH, PUSCH, PDCCH, and PDSCH.’

Although the technical spirit is described focusing primarily on the 3GPP LTE/LTE-A/new RAT (NR) communication system for clarity of description, the technical features are not limited to such communication system.

The 3GPP develops 5th-generation (5G) communication technology to meet the requirements of ITU-R’s next-generation radio access technology after research on 4th-generation (4G) communication technology. Specifically, the 3GPP develops new NR communication technology separate from LTE-A pro and 4G communication technology, which have enhanced LTE-advanced technology to meet the requirements of ITU-R, as 5G communication technology. Both LTE-A pro and NR refer to 5G communication technologies. Hereinafter, 5G communication technology is described focusing on NR unless specified as a specific communication technology.

Operating scenarios in NR define various operating scenarios by adding considerations of satellites, automobiles, and new verticals in the existing 4G LTE scenarios and, from a service point of view, supports the enhanced mobile broadband (eMBB) scenario, the massive machine communication (mMTC) scenario that has high UE density but is deployed in a wide range to requires a low data rate and asynchronous access, and the ultra-reliability and low latency (URLLC) scenario that requires high responsiveness and reliability and may support high-speed mobility.

To meet such scenarios, NR discloses wireless communication systems that adopt a new waveform and frame structure technology, low-latency technology, ultra-high frequency band (mmWave) supporting technology, and forward compatibility providing technology. In particular, the NR system suggests various technical changes in terms of flexibility to provide forward compatibility. The main technical features of NR are described below with reference to the drawings.

<Overview of NR System>

FIG. 1 is a view schematically illustrating a structure for an NR system to which the present embodiments may apply.

Referring to FIG. 1, the NR system is divided into a 5G core network (5GC) and an NR-RAN part. The NG-RAN is constituted of gNB and ng-eNBs providing user plane (SDAP/PDCP/RLC/MAC/PHY) and user equipment (UE) control plane (RRC) protocol termination. The gNBs or the gNBs and the ng-eNBs are interconnected through the Xn interface. The gNB and the ng-eNB are connected to the 5GC through the NG interface. The 5GC may include an access and mobility management function (AMF) which is in charge of the control plane, such as UE access and mobility control function, and a user plane function (UPF) which is in charge of the user data control function. NR supports both the below-6 GHz frequency band (Frequency Range 1 (FR1) and above-6 GHz frequency band (Frequency Range 2 (FR2)).

The gNB means a base station that provides the UE with NR user plane and control plane protocol termination, and the ng-eNB means a base station that provides the UE with the E-UTRA user plane and control plane protocol termination. In the disclosure, the base station should be understood as encompassing gNB and ng-eNB and, as necessary, be used to separately denote gNB or ng-eNB.

<NR Waveform, Numerology, and Frame Structure>

NR uses the CP-OFDM waveform using the cyclic prefix for downlink transmission and CP-OFDM or DFT-s-OFDM for uplink transmission. OFDM technology is easily combined with multiple input multiple output (MIMO) and has the advantages of high frequency efficiency and capability of using a low-complexity receiver.

Meanwhile, since, in NR, the above-described three scenarios have different requirements for data rate, latency, and coverage, it is needed to efficiently meet the requirements for each scenario through the frequency band constituting any NR system. To that end, there has been proposed technology for efficiently multiplexing radio resources based on a plurality of different numerologies.

Specifically, the NR transmission numerology is determined based on the subcarrier spacing and cyclic prefix (CP) and, as shown in Table 1 below, it is exponentially changed, with the exponent value of 2 used as u with respect to 15 kHz.

TABLE 1

| μ | subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
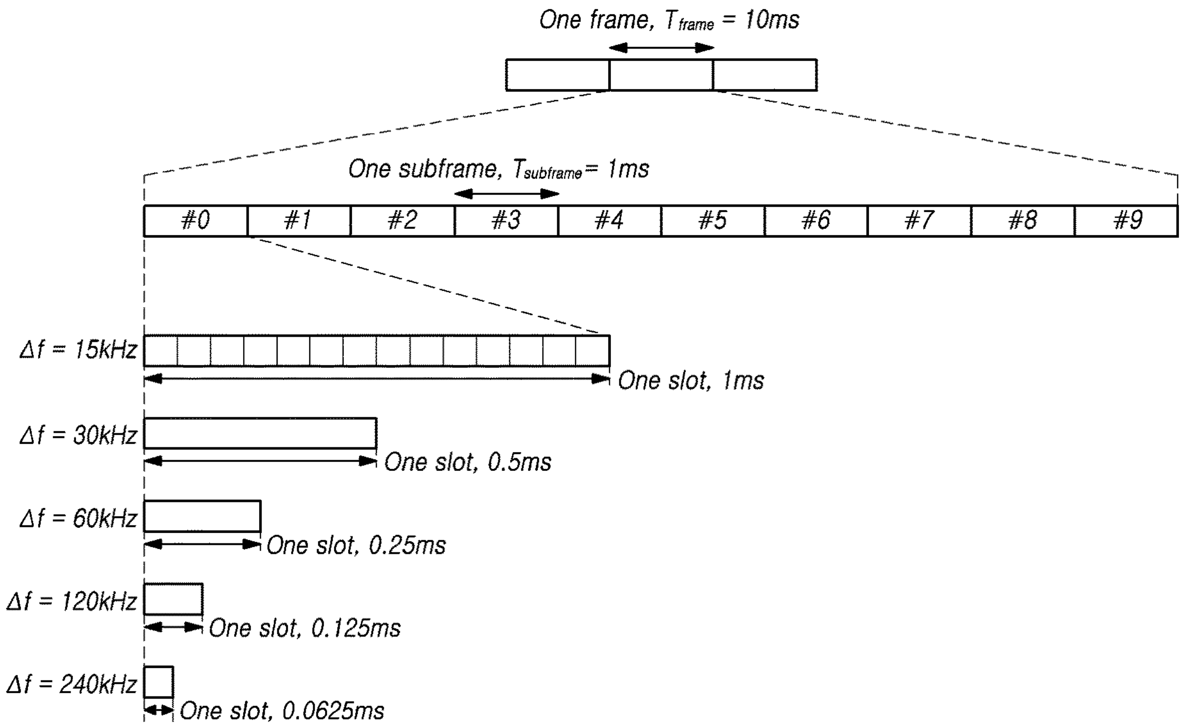
FIG. 2 is a view illustrating a frame structure in an NR system to which the present embodiments may apply.

As shown in Table 1 above, the NR numerologies may be divided into five types depending on the subcarrier spacing. This differs from the subcarrier spacing fixed to 15 kHz in LTE which is one 4G communication technology. Specifically, in NR, the subcarrier spacings used for data transmission are 15, 30, 60, and 120 khz, and the subcarrier spacings used for synchronization signal transmission are 15, 30, 12, and 240 khz. Further, the extended CP is applied only to the 60 khz subcarrier spacing. Meanwhile, as the frame structure in NR, a frame having a length of 10 ms, which is constituted of 10 subframes having the same length of 1 ms, is defined. One frame may be divided into half frames of 5 ms, and each half frame may include 5 subframes. In the case of the 15 khz subcarrier spacing, one subframe is constituted of one slot, and each slot is constituted of 14 OFDM symbols. FIG. 2 is a view illustrating a frame structure in an NR system to which the present embodiments may apply.

Referring to FIG. 2, a slot is fixedly composed of 14 OFDM symbols in the case of the normal CP, but the length of the slot in the time domain may vary depending on the subcarrier spacing. For example, in the case of a numerology having a 15 khz subcarrier spacing, a slot has the same length as the subframe, as the length of 1 ms. In contrast, in the case of a numerology having a 30 khz subcarrier spacing, a slot is constituted of 14 OFDM symbols, but two slots may be included in one subframe, as the length of 0.5 ms. In other words, the subframe and the frame are defined as having a fixed length, and the slot is defined with the number of symbols, and the temporal length may vary depending on the subcarrier spacing.

Meanwhile, NR defined a slot as the basic unit for scheduling and, to reduce transmission latency in the radio section, adopted minislot (or subslot or non-slot based schedule). If a wide subcarrier spacing is used, the length of one slot is inverse-proportionally shortened, so that it is possible to reduce transmission latency in the radio section. The minislot is for efficient support of the URLLC scenario and enables scheduling in the units of 2, 4, or 7 symbols.

Further, NR defined uplink and downlink resource allocation as the symbol level in one slot, unlike LTE. To reduce HARQ latency, a slot structure has been defined which enables HARQ ACK/NACK to be transmitted directly in the transmission slot, and such slot structure is referred to as a self-contained structure in the description.

NR has been designed to be able to support a total of 256 slots and, among them, 62 slot formats are used in 3GPP Rel-15. Further, a common frame structure constituting the FDD or TDD frame is supported through a combination of various slots. For example, a slot structure in which the symbols of the slot all are configured as downlink, a slot structure in which all the symbols are configured as uplink, and a slot structure in which downlink symbols and uplink symbols are combined are supported. Further, NR supports data transmission that is distributed and scheduled in one or more slots. Therefore, the base station may inform the UE whether the slot is a downlink slot, uplink slot, or flexible slot using the slot format indicator (SFI). The base station may indicate the slot format by indicating the index of the table configured through UE-specific RRC signaling, by the SFI and may indicate it dynamically through downlink control information (DCI) or statically or semi-statically through RRC.

<NR Physical Resource>

In connection with the physical resource in NR, antenna port, resource grid, resource element, resource block, and bandwidth part are taken into consideration.

An antenna port is defined so that the channel carried by a symbol on an antenna port may be inferred from the channel carried by another symbol on the same antenna port. Where the large-scale property of the channel carrying a symbol on one antenna port may be inferred from the channel carrying a symbol on a different antenna port, the two antenna ports may be said to have a QC/QCL (quasi co-located or quasi co-location) relationship. Here, the large-scale properties include one or more of delay spread, Doppler spread, frequency shift, average received power, and received timing.

Figure 3:
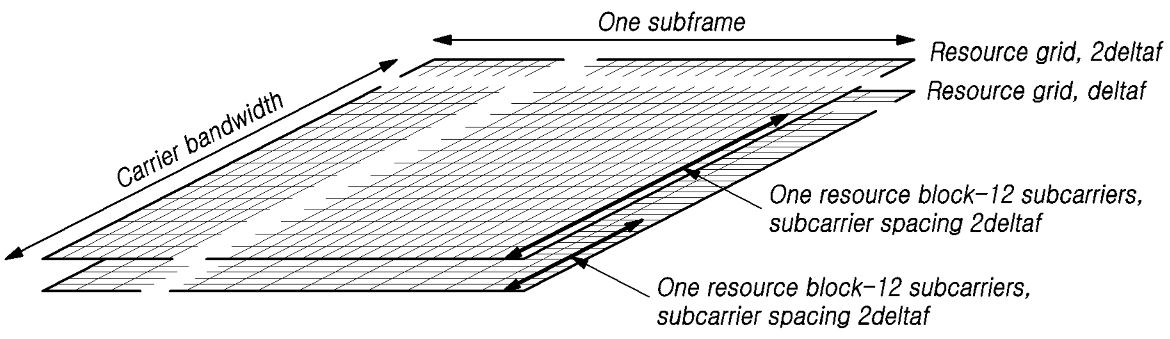
FIG. 3 is a view illustrating a resource grid supported by radio access technology to which the present embodiments may apply.

FIG. 3 is a view illustrating a resource grid supported by radio access technology to which the present embodiments may apply.

Referring to FIG. 3, since NR supports a plurality of numerologies in the same carrier, a resource grid may exist depending on each numerology. Further, the resource grid may exist depending on the antenna port, subcarrier spacing, or transmission direction.

The resource block is constituted of 12 subcarriers and is defined only in the frequency domain. Further, the resource element is constituted of one OFDM symbol and one subcarrier. Therefore, as shown in FIG. 3, the size of one resource block may vary depending on the subcarrier spacing. Further, in NR, "point A", which serves as a common reference point for the resource block grid, and common resource block and virtual resource block are defined.

Figure 4:
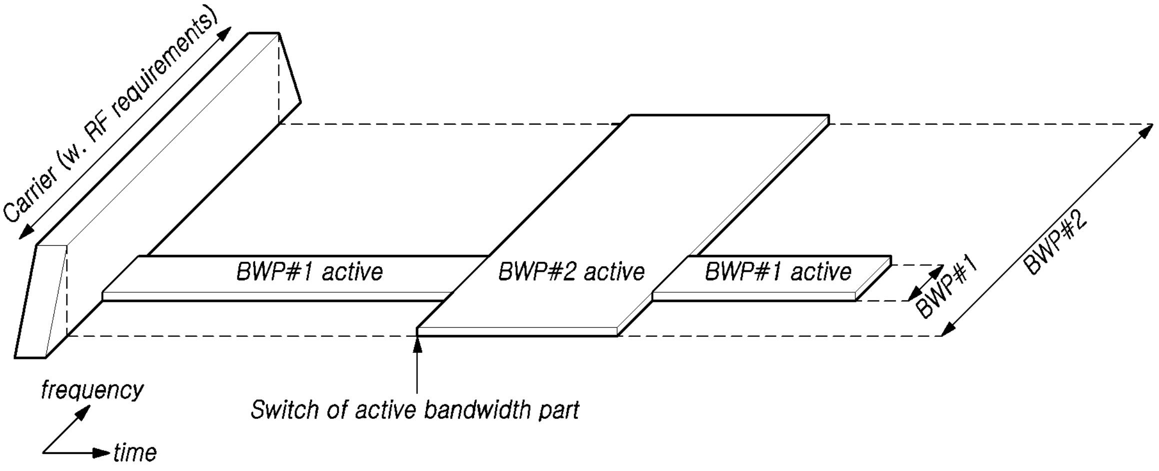
FIG. 4 is a view illustrating a bandwidth part supported by radio access technology to which the present embodiments may apply.

FIG. 4 is a view illustrating a bandwidth part supported by radio access technology to which the present embodiments may apply.

In NR, unlike LTE where the carrier bandwidth is fixed to 20 Mhz, the maximum carrier bandwidth from 50 Mhz to 400 Mhz is set for each subcarrier spacing. Therefore, it is not assumed that all UEs use all of these carrier bandwidths. Accordingly, in NR, as shown in FIG. 4, a bandwidth part (BWP) may be designated within the carrier bandwidth and used by the UE. Further, the bandwidth part is associated with one numerology and is composed of a subset of contiguous common resource blocks and may be activated dynamically over time. Up to four bandwidth parts may be configured in the UE for each of uplink and downlink. Data is transmitted/received using the bandwidth part activated at a given time.

In the case of paired spectra, the uplink and downlink bandwidth parts are set independently, and in the case of unpaired spectra, the bandwidth parts of uplink and downlink are set to make a pair to share the center frequency so as to prevent unnecessary frequency re-tunning between downlink and uplink operations.

<NR Initial Access>

In NR, the UE performs a cell search and random access procedure to access the base station and perform communication.

Cell search is a procedure in which the UE is synchronized with the cell of the base station using the synchronization signal block (SSB) transmitted from the base station, obtains the physical layer cell ID, and obtains system information.

Figure 5:
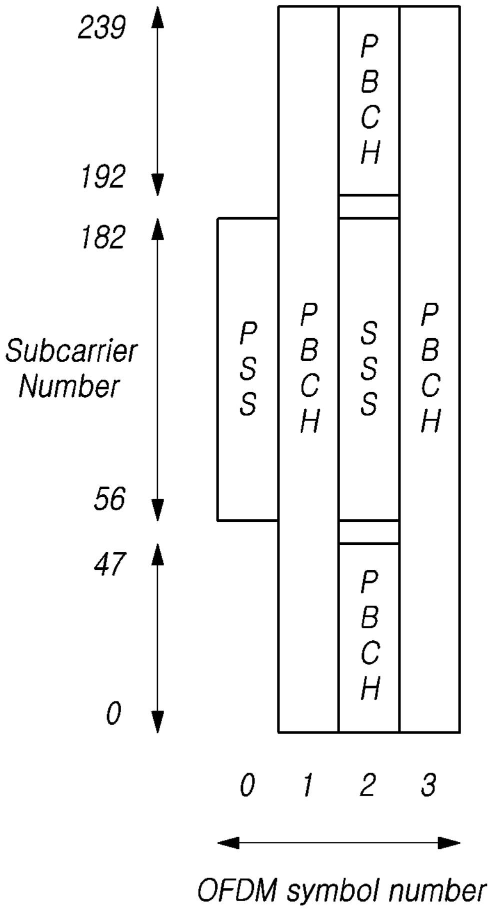
FIG. 5 is a view exemplarily illustrating a synchronization signal block in radio access technology to which the present embodiments may apply.

FIG. 5 is a view exemplarily illustrating a synchronization signal block in radio access technology to which the present embodiments may apply.

Referring to FIG. 5, the SSB is constituted of a primary synchronization signal (PSS) and a secondary synchronization signal (SSS) occupying 1 symbol and 127 subcarriers, respectively, and a PBCH spanning 3 OFDM symbols and 240 subcarriers.

The UE monitors the SSB in time and frequency domains and receives the SSB.

The SSB may be transmitted up to 64 times in 5 ms. Multiple SSBs are transmitted on different transmission beams within 5 ms time, and the UE performs detection assuming that SSBs are transmitted every 20 ms period based on one specific beam used for transmission. The number of beams available for SSB transmission within 5 ms may increase as the frequency band increases. For example, up to 4 SSB beams may be transmitted below 3 GHZ, SSBs may be transmitted using up to 8 different beams in a frequency band of 3 to 6 GHz, and up to 64 different beams in a frequency band of 6 GHz or higher.

Two SSBs are included in one slot, and the start symbol and number of repetitions within the slot are determined according to the subcarrier spacing as follows.

Meanwhile, the SSB is not transmitted at the center frequency of the carrier bandwidth unlike the SS of conventional LTE. In other words, the SSB may be transmitted even in a place other than the center of the system band and, in the case of supporting wideband operation, a plurality of SSBs may be transmitted in the frequency domain. Accordingly, the UE monitors the SSB by a synchronization raster, which is a candidate frequency location for monitoring the SSB. The carrier raster and synchronization raster, which are the center frequency location information about the channel for initial access, are newly defined in NR, and the synchronization raster has a wider frequency interval than the carrier raster, enabling the UE to do a fast SSB search.

The UE may obtain the MIB through the PBCH of the SSB. The master information block (MIB) includes minimum information for the UE to receive remaining system information (remaining minimum system information (RMSI) broadcast by the network. Further, the PBCH may include information about the position of the first DM-RS symbol in the time domain, information for monitoring SIB1 by the UE (e.g., SIB1 numerology information, information related to SIB1 CORESET, search space information, PDCCH-related parameter information, etc.), offset information between the common resource block and the SSB (the absolute location of the SSB within the carrier is transmitted through SIB1), and the like. Here, the SIB1 numerology information is equally applied to some messages used in the random access procedure for the UE to access the base station after completing the cell search procedure. For example, the numerology information about SIB1 may be applied to at least one of messages 1 to 4 for the random access procedure.

The above-described RMSI may mean system information block 1 (SIB1). SIB1 is broadcast periodically (e.g., 160 ms) in the cell. SIB1 includes information necessary for the UE to perform an initial random access procedure, and is periodically transmitted through the PDSCH. To receive SIB1, the UE needs to receive numerology information used for SIB1 transmission and control resource set (CORESET) information used for SIB1 scheduling through the PBCH. The UE identifies scheduling information for SIB1 using SI-RNTI in CORESET and obtains SIB1 on PDSCH according to scheduling information. The remaining SIBs except for SIB1 may be transmitted periodically and may be transmitted at the request of the UE.

Figure 6:
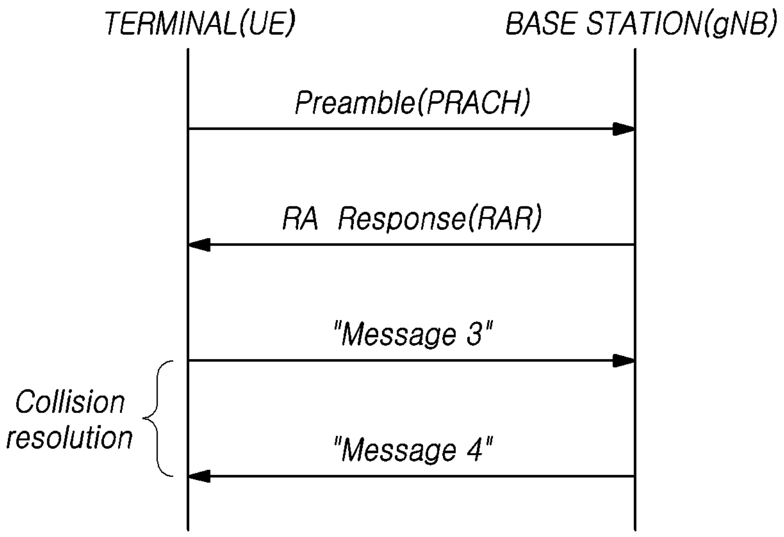
FIG. 6 is a view illustrating a random access procedure in radio access technology to which the present embodiments may apply.

FIG. 6 is a view illustrating a random access procedure in radio access technology to which the present embodiments may apply.

Referring to FIG. 6, if the cell search is completed, the UE transmits a random access preamble for random access to the base station. The random access preamble is transmitted through PRACH. Specifically, the random access preamble is transmitted to the base station through the PRACH composed of contiguous radio resources in a periodically repeated specific slot. In general, when the UE initially accesses the cell, a contention-based random access procedure is performed, and when random access is performed for beam failure recovery (BFR), a non-contention-based random access procedure is performed.

The UE receives a random access response to the transmitted random access preamble. The random access response may include a random access preamble identifier (ID), uplink radio resource (UL grant), temporary cell-radio network temporary identifier (C-RNTI), and time alignment command (TAC). Since one random access response may include random access response information for one or more UEs, the random access preamble identifier may be included to indicate to which UE the included UL grant, temporary C-RNTI, and TAC are valid. The random access preamble identifier may be an identifier for the random access preamble received by the base station. The TAC may be included as information for the UE to adjust uplink synchronization. The random access response may be indicated by the random access identifier on the PDCCH, that is, the random access-radio network temporary identifier (RA-RNTI).

Upon receiving a valid random access response, the UE processes information included in the random access response and performs scheduled transmissions to the base station. For example, the UE applies the TAC and stores the temporary C-RNTI. Further, the UE transmits data stored in the buffer of the UE or newly generated data to the base station using the UL grant. In this case, information that may identify the UE should be included.

Finally, the UE receives a downlink message for contention resolution.

<NR CORESET>

In NR, the downlink control channel is transmitted in a control resource set (CORESET) having a length of 1 to 3 symbols and transmits uplink/downlink scheduling information, slot format index (SFI), transmit power control (TPC) information, etc.

As such, NR introduced the concept of CORESET to secure the flexibility of the system. The control resource set (CORESET) means a time-frequency resource for a downlink control signal. The UE may use one or more search spaces in CORESET time-frequency resources to decode control channel candidates. A quasi co-location (QCL) assumption for each CORESET has been set, which is used for the purpose of indicating the characteristics of the analog beam direction in addition to the latency spread, Doppler spread, Doppler shift, and average latency, which are characteristics assumed by the conventional QCL.

Figure 7:
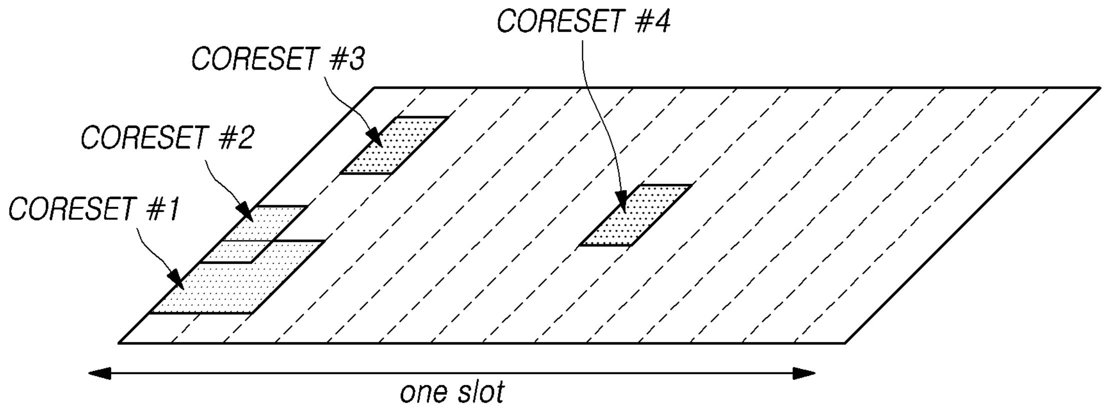
FIG. 7 is a view illustrating a CORESET.

FIG. 7 is a view illustrating a CORESET.

Referring to FIG. 7, the CORESET may exist in various forms within a carrier bandwidth within one slot. In the time domain, the CORESET may be constituted of up to 3 OFDM symbols. Further, the CORESET is defined as a multiple of 6 resource blocks up to the carrier bandwidth in the frequency domain.

The first CORESET is indicated through the MIB as part of the initial bandwidth part configuration to allow additional configuration and system information to be received from the network. After connection setup with the base station, the UE may receive and configure one or more CORESET information through RRC signaling.

As used herein, the frequency, frame, subframe, resource, resource block, region, band, subband, control channel, data channel, synchronization signal, various reference signals, various signals, and various messages related to new radio (NR) may be interpreted in various meanings as currently used or to be used in the future.

<Sidelink>

In the conventional LTE system, for direct communication between UEs and providing a V2X (particularly V2V) service, a radio channel and radio protocol have been designed for inter-UE direct communication (i.e., sidelink).

In relation to the sidelink, S-PSS/S-SSS, which is a synchronization signal for synchronization between a wireless sidelink transmitting end and a receiving end, and physical sidelink broadcasting channel (PSBCH) for transmitting and receiving a sidelink master information block (MIB) related thereto have been defined, and physical sidelink discovery channel (PSDCH), physical sidelink control channel (PSCCH) for sidelink control information (SCI) transmission/reception, and physical sidelink shared channel (PSSCH) have been designed.

Further, to allocate a radio resource for sidelink, technology has been developed separately into mode 1 in which the base station allocates a radio resource and mode 2 in which the UE selects and allocates one from a radio resource pool. Further, the LTE system required an additional technical evolution to meet the V2X scenario.

In this environment, 3GPP derived 27 service scenarios related to vehicle recognition in Rel-14 and determined the main performance requirements according to road conditions. Further, in the recent Rel-15, 25 more advanced service scenarios, such as platooning, advanced driving, and long-distance vehicle sensors, were derived, and six performance requirements were determined.

To meet these performance requirements, technology development has been conducted to enhance the performance of sidelink technology developed based on conventional D2D communication to meet the requirements of V2X. In particular, to apply to cellular-V2X (C-V2X), a technology that enhances the physical layer design of sidelink to be suitable for a high-speed environment, resource allocation technology, and synchronization technology may be selected as major research technologies.

The sidelink described below may be understood as encompassing links used for D2D communication developed after 3GPP Rel-12, V2X communication after Rel-14, and NR V2X after Rel-15. Further, each channel term, synchronization term, and resource term are described with the same terms regardless of D2D communication requirements and V2X Rel-14 and 15 requirements. However, for convenience of understanding, the differences of sidelinks meeting V2X scenario requirements from the sidelinks for D2D communication in Rel-12/13 are mainly described as necessary. Accordingly, the sidelink-related terms described below are divided merely for D2D communication/V2X communication/C-V2X communication for convenience of understanding and comparison, and are not limited to a specific scenario.

<Resource Allocation>

Figure 8:
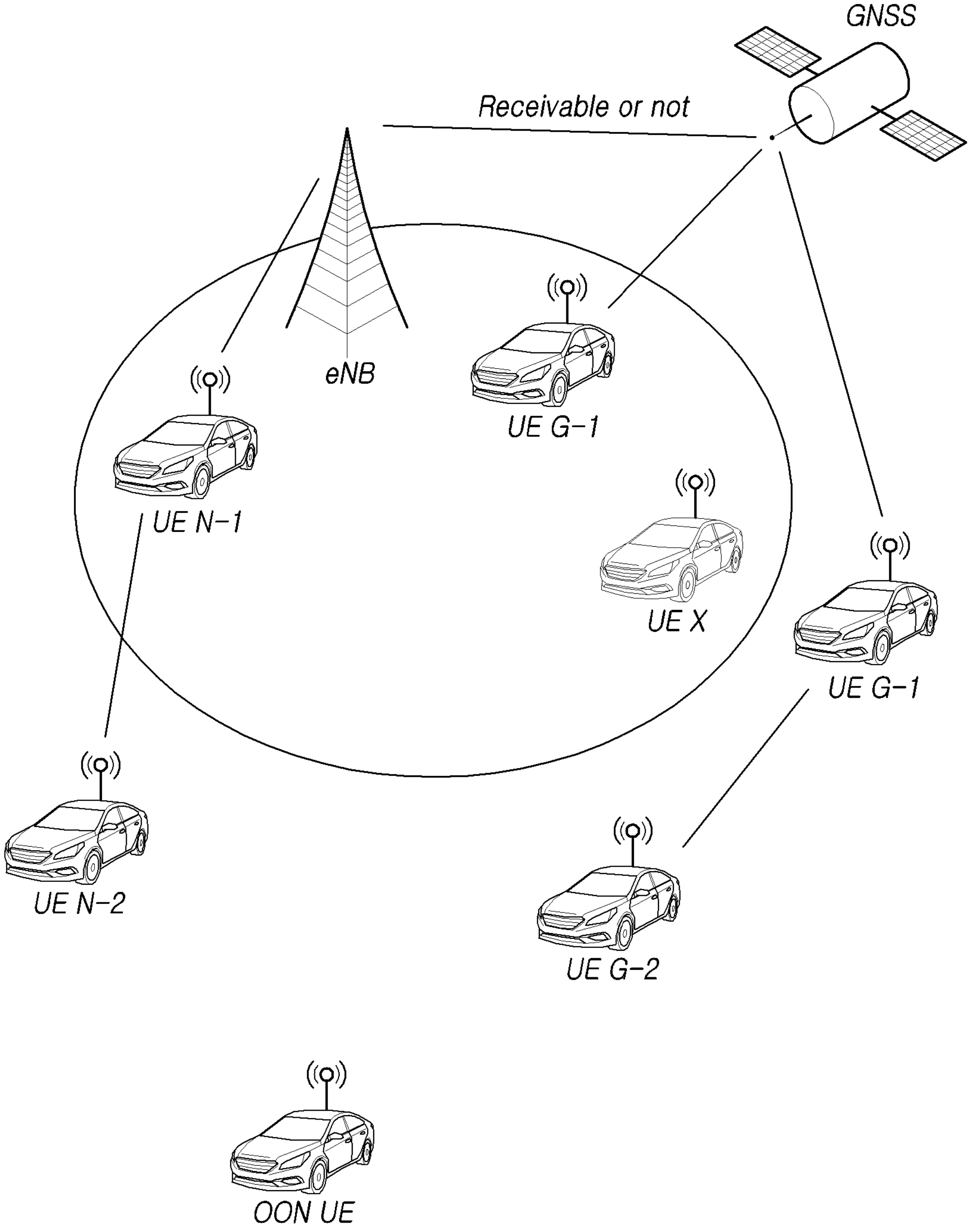
FIG. 8 is a view illustrating various scenarios for V2X communication.

FIG. 8 is a view illustrating various scenarios for V2X communication.

Referring to FIG. 8, a V2X UE (marked as a vehicle, but may be set in various ways, such as UE) may be positioned within or outside the coverage of the base station (eNB or gNB or ng-eNB). For example, communication may be performed between UEs (UE N-1, UE G-1, and UE X) within the coverage of the base station, or communication may be performed between a UE within the coverage of the base station and a UE outside (e.g., UE N-1, UE N-2). Or, communication may be performed between UEs (e.g., UE G-1 and UE G-2) outside the coverage of the base station.

In these various scenarios, allocation of radio resources for communication is required in order for the corresponding UE to perform communication using the sidelink, and the allocation of radio resources largely includes base station handling allocation and UE self-selection and allocation.

Specifically, the scheme in which the UE allocates resources in the sidelink includes a scheme in which the base station involves in selection and management of resources (mode 10 and a scheme in which the UE itself selects resources (mode 2). In mode 1, the base station schedules a scheduling assignment (SA) pool resource region and a DATA pool resource region allocated thereto to the transmission UE.

Meanwhile, the resource pool may be subdivided into several types. First, the resource pool may be divided according to the contents of the sidelink signal transmitted in each resource pool. For example, the contents of the sidelink signal may be divided, and for each, a separate resource pool may be configured. As the contents of the sidelink signal, there may be a scheduling assignment (SA), a sidelink data channel, and a discovery channel.

The SA may be a signal including information such as the position of the resource used by the transmission UE in transmission of the following sidelink data channel and modulation and coding scheme (MCS) or MIMO transmission scheme necessary for modulation of other data channels, and timing advance (TA). This signal may be multiplexed with the sidelink data on the same resource unit and transmitted and, in this case, the SA resource pool may mean a pool of resources in which the SA is multiplexed with the sidelink data and transmitted.

Meanwhile, the FDM scheme applied to V2X communication may reduce the latency time when a data resource is allocated after SA resource allocation. For example, a non-adjacent scheme of separating the control channel resource and the data channel resource in one subframe in the time domain and an adjacent scheme in which the control channel and the data channel are contiguously allocated in one subframe are considered.

Meanwhile, when the SA is multiplexed and transmitted with the sidelink data on the same resource unit, only sidelink data channel except for the SA information may be transmitted in the resource pool for the sidelink data channel. In other words, the resource elements which have been used to transmit SA information on the individual resource unit in the SA resource pool may still be used to transmit sidelink data in the sidelink data channel resource pool. The discovery channel may be a resource pool for messages to allow the transmission UE to transmit its ID or such information to be discovered by the adjacent UE. Even when the contents of the sidelink signal are the same, different resource pools may be used depending on the transmission/reception attributes of the sidelink signal.

As an example, despite the sidelink data channel or discovery message, they may be divided into different resource pools depending on sidelink signal transmission timing determination schemes (e.g., whether it is transmitted at the time of reception of a sync reference signal or it is transmitted, with a predetermined TA applied), resource allocation schemes (e.g., whether the base station designates the transmission resources of individual signals for UE or individual transmission UEs select individual signal transmission resources on their own), signal formats (e.g., the number of symbols each sidelink signal occupies in one subframe or the number of subframes used for transmission of one sidelink signal), signal strengths from the base station, or the transmit power strengths of sidelink UE.

<Synchronization Signal>

As described above, a sidelink communication UE is highly likely to be positioned outside the base station coverage. Even in this case, communication using the side link should be performed. To this end, the issue of obtaining synchronization by the UE positioned outside the base station coverage is important.

A method for synchronization in time and frequency in sidelink communication, particularly communication between vehicles, between a vehicle and another UE, and between a vehicle and the infrastructure network is described based on the foregoing description.

D2D communication used a sidelink synchronization signal (SLSS), which is a synchronization signal transmitted from the base station for time synchronization between UEs. In C-V2X, a satellite system (global navigation satellite system (GNSS) may be additionally considered to enhance synchronization performance. However, priority may be given to synchronization establishment or the base station may indicate priority information. For example, the UE first selects the synchronization signal directly transmitted by the base station in determining transmission synchronization of the UE and, if the UE is positioned at the edge of the coverage of the base station, synchronization is preferentially made preferentially with the SLSS transmitted by the UE inside the coverage of the base station.

Meanwhile, the wireless UE installed in the vehicle or the UE mounted in the vehicle is relatively less susceptible to the battery consumption issue and may use satellite signals, such as GPS, for navigation purposes, and may thus use satellite signals in establishing synchronization in time and frequency between UEs. Here, the satellite signals may be GNSS signals, such as global navigation satellite system (GLONAS), GALILEO, and BEIDOU in addition to the exemplified global positioning system (GPS).

Meanwhile, sidelink synchronization signals may include a sidelink primary synchronization signal (S-PSS) and a sidelink secondary synchronization signal (S-SSS). The S-PSS may have a Zadoff-chu sequence of a predetermined length or a similar/modified/repeated structure of the PSS. Further, unlike the DL PSS, other Zadoff Chu root indexes (e.g., 26 and 37) may be used. The S-SSS may have a similar/modified/repeated structure of the SSS or the M-sequence. If the UEs are synchronized from the base station, the SRN becomes the base station, and the sidelink synchronization signal (S-SS) becomes the PSS/SSS.

Unlike DL PSS/SSS, S-PSS/S-SSS follows the UL subcarrier mapping scheme. The physical sidelink broadcast channel (PSBCH) may be a channel where basic system information that the UE needs to know first before transmitting and receiving sidelink signals (e.g., information related to S-SS, duplex mode (DM), TDD UL/DL configuration, resource pool related information, type of application related to S-SS, subframe offset, broadcast information, etc.) is transmitted. The PSBCH may be transmitted on the same subframe as the S-SS or on a subsequent subframe. The DMRS may be used for demodulation of PSBCH. The S-SS and PSBCH may be referred to as sidelink synchronization signal block (S-SSB).

The SRN may be a node transmitting S-SS and PSBCH. The S-SS may have a specific sequence form. The PSBCH may have a form of a sequence indicating specific information or a codeword that has undergone predetermined channel coding. Here, the SRN may be a base station or a specific sidelink UE. In the case of partial network coverage or out of network coverage, the UE may become the SRN.

Further, the S-SS may be relayed for sidelink communication with out-of-coverage UEs as needed and be relayed through multiple hops. In the following description, relaying a synchronization signal is a concept that includes not only directly relaying a synchronization signal of a base station but also transmitting a sidelink synchronization signal in a separate format according to the synchronization signal reception time. As the sidelink synchronization signal is so relayed, the in-coverage UE and the out-of-coverage UE may directly communicate.

<Nr Sidelink>

As described above, unlike V2X based on the LTE system, there is a demand for NR-based V2X technology to meet complex requirements, such as of autonomous driving.

NR V2X intends to flexibly provide V2X services in more diverse environments by applying the frame structure, numerology, and channel transmission and reception procedures of NR. To this end, development of technologies, such as a resource sharing technology between a base station and a UE, a sidelink carrier aggregation (CA) technology, a partial sensing technology for a pedestrian UE, and sTTI is required.

NR V2X is determined to support unicast and group cast as well as broadcast used in LTE V2X. In this case, for groupcast and unicast, the target group ID is determined to be used, but whether to use the source ID is determined to be discussed later.

Further, as HARQ for QoS is supported, control information is determined to include the HARQ process ID as well. In LTE HARQ, the PUCCH for HARQ is transmitted four subframes after downlink transmission. However, in NR HARQ, the PUCCH resource and feedback timing may be indicated by the PUCCH resource indicator or PDSCH-to-HARQ feedback timing indicator in, e.g., DCI format 1_0 or 1_1.

In LTE V2X, separate HARQ ACK/NACK information was not transmitted to reduce system overhead, and for data transmission stability, the transmission UE was determined to be able to retransmit data once according to its selection. However, NR V2X is able to transmit HARQ ACK/NACK information in light of data transmission stability and, in this case, bundle and transmit information, reducing overhead.

In other words, the transmission UE UE1 may transmit three data to the reception UE UE2 and, if the reception UE generates HARQ ACK/NACK information in response, the information may be bundled and transmitted through the PSCCH.

Meanwhile, in FR1 for the frequency domain below 3 GHz, it was determined to later discuss 15 kHz, 30 kHz, 60 kHz, and 120 kHz as subcarrier spacing (SCS) candidates. Further, for FR2 for the frequency domain above 3 GHz, it was determined to discuss 30 kHz, 60 kHz, 120 kHz, and 240 kHz as subcarrier spacing (SCS) candidates. NR V2X may support minislots (e.g., 2/4/7 symbols) smaller than 14 symbols as the minimum scheduling unit.

As RS candidates, DM-RS, PT-RS, CSI-RS, SRS, and AGC training signals were determined to be discussed.

Sidelink UL SPS

In general, UL transmission using SPS may cause some latency when the gap between user data generation and configured SPS resources is large. Therefore, when SPS is used for latency-sensitive traffic, such as sidelink communication, the SPS scheduling interval should be small enough to support the latency requirements.

However, a smaller SPS scheduling interval may result in more overhead since the UE may not fully utilize the configured SPS resources. Therefore, the gap between user data generation and the configured SPS resources should be small, and the SPS scheduling interval should be suitable to meet the latency requirements. Currently, there is no mechanism to support this feature.

The UE may receive an SPS configuration for one or more specific logical channels. The UE may receive SPS configuration for a specific logical channel through system information, an RRC connection setup message, an RRC connection reconfiguration message or an RRC connection release message.

When data is available for a specific logical channel(s), the UE may request the base station to activate SPS and then perform UL transmission using the configured SPS resources according to the SPS activation command received from the base station. The UE may transmit an SPS activation request to the base station through a physical uplink control channel (PUCCH), MAC control element (CE) or RRC message. In other words, the UE may transmit an SPS activation request to the base station using control resources used for requesting SPS activation. The control resource may be a PUCCH resource, a random access resource, or a new UL control channel resource. Further, the UE may transmit an SPS activation request to the base station during, e.g., RRC connection (re-)establishment, during handover, after handover, or in RRC_CONNECTED.

Since the UE actively requests SPS activation from the base station when there is UL data to be transmitted, the gap between the generation of UL data and configured SPS resources may be reduced.

For example, the UE receives SPS configuration information including three SPS configurations from the base station. If there is UL data to be transmitted in the upper layer, the UE transmits an SPS request message to the base station through a MAC CE, for example. The base station sends an Ack message for one of the three SPS configurations. The UE transmits UL data through a specific resource, e.g., in a 1 sec period, according to the corresponding SPS configuration.

Meanwhile, if there is UL data to be transmitted in the upper layer at a specific time, the UE transmits again an SPS request message to the base station through a MAC CE, for example. The base station sends an Ack message for another one of the three SPS configurations. The UE transmits UL data through a specific resource, e.g., in a 100 sec period, according to the corresponding SPS configuration.

Meanwhile, S-SS id_net is a set of S-SS IDs used by UEs that have selected the synchronization signal of the base station as a synchronization reference among physical layer SLSS IDs {0, 1, . . . , 335} and may be {0, 1, . . . , 167}. Further, S-SS id_oon is a set of S-SS IDs used when the base stations/out-of-coverage UEs transmit synchronization signals by themselves, and may be {168, 169, . . . , 335}.

As described above, unlike conventional signal transmission and reception between a base station and a UE, sidelink communication between UEs performs resource allocation, time synchronization setting, and reference signal transmission independently or in conjunction with the base station.

In particular, in the case of next-generation radio access technology (including terms, such as NR and 5G), a number of protocols between the base station and the UE have been added/modified. Therefore, unlike the conventional LTE technology-based V2X communication protocol, NR technology-based sidelink communication also requires development of various protocols.

In the disclosure, there are proposed operations, such as PSCCH, PSSCH, or DMRS configuration, resource allocation, and synchronization signal reception when the transmission UE and the reception UE perform sidelink communication. Each embodiment below is described focusing on sidelink communication, but may also be applied to C-V2X and D2D communication as described above.

As the subcarrier spacing (SCS) of the OFDM communication system is varied in NR, the frame structure of the sidelink to be used for information transmission and reception in sidelink communication needs to be changed as well.

In the present embodiments, the sidelink signal may use the CP-OFDM-type waveform of the CP-OFDM type and the DFT-s-OFDM type. Further, the sidelink may use the following subcarrier spacing (hereinafter, 'SCS'). For example, in frequency range (FR) 1 which uses a frequency band less than 6 GHz, SCSs of 15 kHz, 30 kHz, and 60 kHz are used and, in this case, the 60 kHz spacing, which exhibits the best performance, may be set to be used. In FR2 which uses a frequency band of 6 GHz or more, spacings of 60 kHz and 120 kHz are used, and the 60 KHz band may primarily be used.

Further, the sidelink uses a cyclic prefix (CP) to prevent modulation that may arise during the course of wireless communication transmission/reception, and its length may be set to be equal to the length of the normal CP of the NR Uu interface. If necessary, an extended CP may be applied.

As described above, sidelink communication may be performed based on NR radio access technology. Further, given a scenario for sidelink communication, there is a likelihood that multiple UEs gather in a predetermined range and perform communication, as when platooning.

In this case, the radio resources for sidelink communication may frequently collide with each other. In particular, a procedure for settling resource conflict may be required in Mode 2 in which the UE selects a sidelink communication resource from a predetermined resource pool based on a sensing operation, unlike in Mode 1 in which the base station allocates and schedules a sidelink communication resource.

Further, frequent use of sidelink communication may cause an overlap in transmission/reception between the HARQ feedback information transmitted by a specific UE and the HARQ feedback information received by the specific UE.

In this context, an embodiment for technology of HARQ feedback transmission/reception radio resource coordination and technology of radio resource coordination for sidelink communication is described below.

Figure 9:
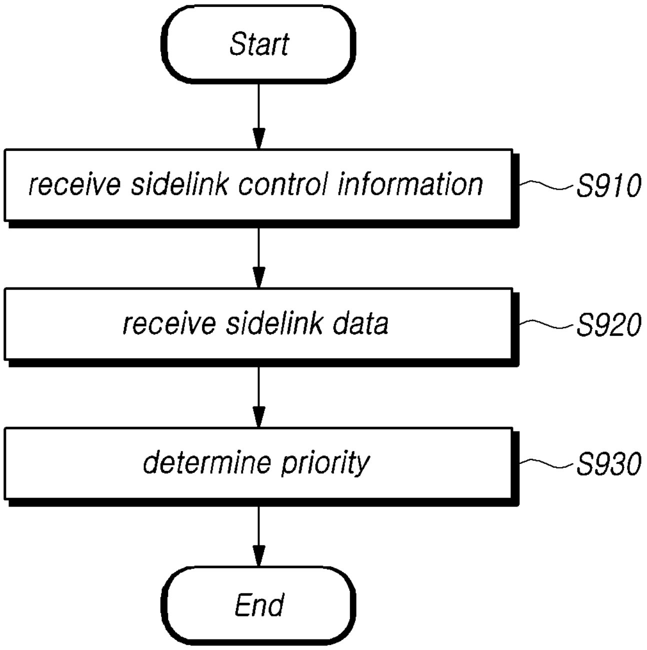
FIG. 9 is a view illustrating operations of a UE according to an embodiment.

FIG. 9 is a view illustrating operations of a UE according to an embodiment.

Referring to FIG. 9, the terminal controlling the sidelink communication may perform the step of receiving sidelink control information from a second terminal (S910).

For example, the sidelink control information may be transmitted through PSCCH and PSSCH. The sidelink control information may include various pieces of information, such as reserved radio resource information, scheduling information, and priority information, in the respective fields.

The UE may perform the step of receiving first sidelink data according to scheduling of sidelink control information (S920).

For example, upon receiving the sidelink control information, the UE may receive the sidelink data in the radio resource indicated by the sidelink control information. The sidelink data may be received through the PSSCH.

In general, when receiving sidelink data, the UE may generate and transmit HARQ feedback information therefor. Alternatively, the UE may transmit HARQ feedback information only when specific feedback information is generated according to the HARQ feedback option. Alternatively, the UE may not transmit HARQ feedback information. Various HARQ feedback information transmission-related options may be set in association with transmission types.

When the time resource for transmitting the first HARQ feedback information for the first sidelink data and the time resource for receiving the second HARQ feedback information for the second sidelink data transmitted by the UE overlap at least in part, the UE may perform the step of determining a priority (S930).

For example, the UE may transmit second sidelink data to the second UE or another UE. In this case, the second UE or other UE may be configured to transmit the second HARQ feedback for the second sidelink data transmitted by the UE. Accordingly, the UE needs to receive HARQ feedback for the sidelink data, which it has transmitted, at a specific time. Meanwhile, the UE may be configured to transmit the first HARQ feedback information for the first sidelink data received from the second UE.

When a specific condition is met, the first HARQ feedback transmission and the second HARQ feedback reception may occur in the same time period. Alternatively, some of the time resources for transmitting the first HARQ feedback and the time resources for receiving the second HARQ feedback may overlap.

Therefore, the UE needs to determine the priority so that when the time resources of the first HARQ feedback transmission and the second HARQ feedback reception overlap, either operation is performed.

For example, the UE may determine the priority based on the transmission types of the first sidelink data and the second sidelink data. Here, the transmission types may be divided into a unicast type, a group cast type, and a broadcast type. For example, the UE may determine that if the first sidelink data is received through unicast and the second sidelink data is transmitted through groupcast, the first HARQ feedback transmission for the first sidelink data transmitted in the unicast type is prioritized. Of course, the opposite case is also possible.

As another example, the UE may determine the priority based on a result of comparison between the respective pieces of priority information of the first sidelink data and the second sidelink data. The UE may control to prioritize processing of HARQ feedback for higher-priority data. For example, the priority information may be determined by the priority field value included in sidelink control information associated with each of the first sidelink data and the second sidelink data. In other words, priority information may be determined by the priority field value included in the sidelink control information, and the corresponding priority field value is applied to the sidelink data scheduled by the sidelink control information. The UE may identify and compare the priority field values associated with two sidelink data, and prioritize processing of the HARQ feedback information associated with the sidelink data having the lower value.

The priority field value may be determined considering various factors. For example, the priority field value may be determined based on the service type of the corresponding sidelink data. Or, the priority field value may be determined based on the transmission types of the first sidelink data and the second sidelink data. As described above, the transmission type may be determined as one of the unicast type, the groupcast type, and the broadcast type.

As another example, when the respective pieces of priority information about the first sidelink data and the second sidelink data indicate the same priority, the priority may be determined based on any one of the HARQ option type information about each of the first HARQ feedback information and the second HARQ feedback information and the format type of the sidelink control channel.

For example, when the same priority field value is set, the UE may determine the priority based on the HARQ feedback option type information set in each sidelink data. For example, the option type set to transmit the HARQ only in the case of a NACK may be determined to be higher in priority than the option type set to be fed back in the case of an ACK/NACK.

Or, when an NACK is included in the HARQ feedback information, it may be determined to prioritize transmission of HARQ feedback information over reception of HARQ feedback information. Or, the priority may be determined based on the transmission channel format of the sidelink control information.

Through the above-described operations, even when transmission and reception of HARQ feedback information overlap, the UE may unambiguously operate to efficiently perform sidelink communication.

Operations of the UE to adjust the overlap of radio resources of sidelink communication, not HARQ feedback information, are described below.

For example, the sidelink control information may further include sidelink reserved resource information. Through the sidelink reserved resource information, the UE may obtain information about the sidelink radio resource that the second UE is to use.

The UE may further include the step of determining whether to transmit coordination information before receiving the first sidelink data and the step of, if transmission for the coordination information is determined, transmitting the coordination information including any one of collision indication information, preferred resource information, and non-preferred resource information to the second UE.

The operation of determining to transmit the coordination information, the information included in the coordination information, and the operation performed when the second UE receives the coordination information are described below in greater detail with reference to the drawings. In the following description, S920 and S930 described above are excluded. Of course, the operations may also be performed in association with the excluded steps.

Figure 10:
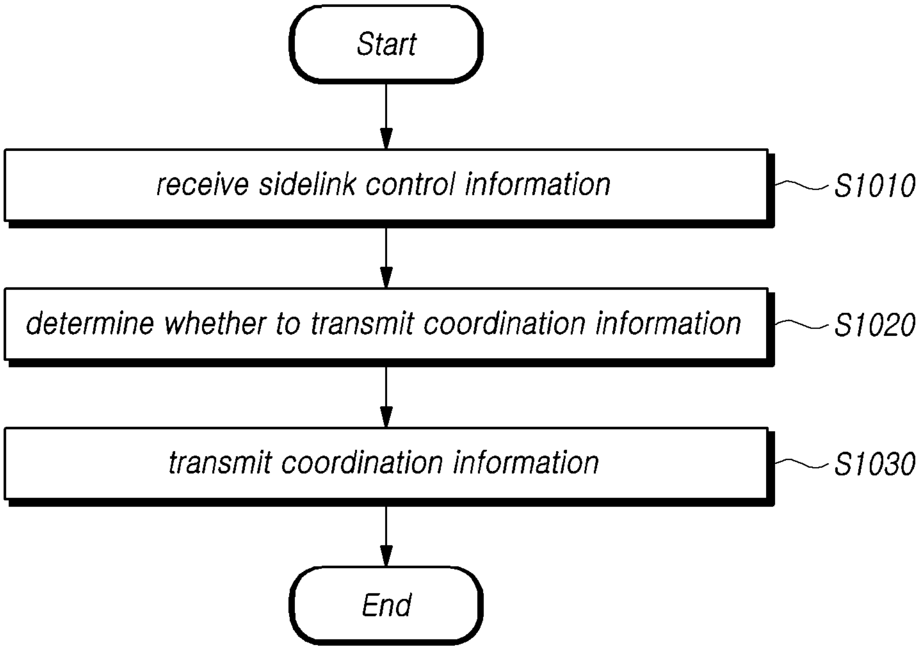
FIG. 10 is a view for describing operations of a UE according to another embodiment.

FIG. 10 is a view for describing operations of a UE according to another embodiment.

Referring to FIG. 10, the terminal controlling the sidelink communication may perform the step of receiving sidelink control information including sidelink reserved resource information from a second terminal (S1010).

For example, when performing sidelink communications, the terminal may select resources to use from a specific pool of radio resources. Alternatively, the terminal may use specific radio resources as radio resources for sidelink communication according to the base station's scheduling. In other words, there are two ways in which the terminal selects radio resources for sidelink communication: mode 1 in which radio resources are scheduled by the base station, and mode 2 in which the UE itself selects radio resources from a specific pool.

If the mode 2 method is used, the terminal may select a radio resource using the sensing result value within the radio resource pool that the base station configures for each device. Therefore, when multiple terminals perform sidelink communication, such as platooning, there is a possibility of conflict between the radio resources selected by the terminals.

To that end, the terminal transmits sidelink reserved resource information to use the selected radio resource. The sidelink reserved resource information may be included and transmitted in the sidelink control information. The sidelink control information is transmitted via PSCCH and PSSCH. The above-described sidelink reserved resource information may be transmitted through at least one of the PSCCH and PSSCH channels.

The terminal may receive the sidelink reserved resource information transmitted from the second terminal via at least one of the above-described PSCCH and PSSCH channels. The sidelink reserved resource information may include at least one piece of radio resource information.

The terminal may perform the step of determining whether to transmit the coordination information (S1020).

For example, the terminal may determine whether it is necessary to transmit coordination information to prevent radio resource conflict.

As an example, the terminal may determine that transmission of the coordination information is required when request information requesting the coordination information is received from the second terminal. The request information may be included and received in the above-described sidelink control information. In this case, the coordination information may include either preferred resource information or non-preferred resource information. Or, the coordination information may include both the preferred and non-preferred resource information.

As another example, the terminal may determine that transmission of the coordination information is necessary if the radio resources indicated by the sidelink reserved resource information transmitted by the second terminal at least partially overlap the sidelink reserved resource information reserved by at least one other terminal and received by the terminal. For example, the terminal may receive sideline reserved resource information transmitted by the second terminal as well as at least one other terminal. In this case, the terminal determines whether the reserved resources of the second terminal and the other terminal overlap by using the sidelink reserved resource information transmitted by the second terminal and the sidelink reserved resource information transmitted by the other terminal. When all or some overlap, the terminal may determine that it is necessary to send coordination information. In this case, the coordination information includes conflict indication information that indicates whether or not the sidelink reserved resource information transmitted by the second terminal is in conflict. Further, in this case, the coordination information may not include the above-described preferred and non-preferred resource information.

As another example, the terminal may use the result of comparison between the sidelink reserved resource information transmitted by the second terminal and the sidelink radio resource already used for communication by the other terminal. In other words, the terminal may determine to transmit coordination information when the reserved resources of the second terminal at least partially overlap the radio resources being used by the other terminal.

Besides, the terminal may determine to periodically transmit coordination information based on a preset period. Alternatively, the terminal may determine to transmit the coordination information when a preset event condition is met.

When it is determined to transmit the coordination information, the step of transmitting the coordination information including any one of the collision indication information, preferred resource information and the non-preferred resource information to the second terminal may be performed (S1030).

For example, the preferred resource information may include information about radio resources that the terminal prefers to be used by the second terminal. The non-preferred resource information may include information about radio resources that the terminal does not expect to be used by the second terminal.

As an example, the preferred resource information included in the coordination information may include at least one radio resource selected based on the sidelink reserved resource information reserved by at least one other terminal, received by the terminal. For example, when the terminal includes and transmits the preferred resource information in the coordination information, the terminal may select the preferred resource information based on the sidelink reserved resource information about the other terminal. Specifically, at least one selected radio resource included in the preferred resource information may be configured to exclude the sidelink reserved resource information having an RSRP measurement value larger than a preset threshold from the sidelink reserved resource information reserved by at least one other transmission UE. The UE may measure the RSRP for each of at least one radio resource included in the sidelink reserved resource information received from at least one other transmission UE. The UE compares the RSRP value measured for each of at least one radio resource and a preset RSRP threshold. Thereafter, the UE configures the preferred resource information so that the reserved resources exceeding the threshold among the reserved resources of the other UE are not included in the preferred resource information. This is why if measured as a predetermined level of RSRP measurement value or less, although the radio resources overlap the other UE, the likelihood of conflict with the second UE to occur is low due to, e.g., the distance or blockage. Further, if the reserved resources of all other UEs are excluded from the preferred resource information, the above-described operations may be required because the preferred resource information to be substantially transmitted to the second UE is highly likely to be insufficient.

As another example, the non-preferred resource information included in the coordination information may include the sidelink reserved resource information reserved by at least one other UE and at least one radio resource determined based on the RSRP measurement value measured by the UE. For example, the non-preferred resource information may be determined based on the RSRP measurement value for at least one radio resource included in the sidelink reserved resource information reserved by the other UE. Similar to the preferred resource information, the UE may include the reserved resource having a predetermined level of RSRP measurement value or more in the non-preferred resource information. Or, the UE may also include the reserved resource reserved by the other UE and the radio resource having the predetermined level of RSRP measurement value or more measured by the UE in the non-preferred resource information.

Meanwhile, the coordination information may be included in the sidelink control information transmitted by the UE. As described above, the coordination information may be transmitted through at least one of the PSCCH and PSSCH channels.

Meanwhile, the coordination information may include a different value depending on the cause of the determination of transmitting the coordination information. For example, when the coordination information is transmitted according to reception of request information from the second UE or transmitted by periodic transmission, the coordination information includes at least one of the preferred resource information and the non-preferred resource information. In contrast, if the coordination information is transmitted when the second UE's sidelink reserved resource information conflicts or is predicted to conflict, the coordination information includes only conflict indication information.

Meanwhile, upon receiving the coordination information, the second UE selects or reselects radio resources for sidelink communication.

For example, the second UE may select or reselect sidelink resources using at least one of the coordination information and the sensing result resource information sensed in the sensing window. The sensing window means a time interval for selecting a radio resource by each UE to perform sidelink communication. Each UE selects or reselects a specific radio resource in the resource pool using the radio resource sensing result value sensed in the sensing window. Thus, if the coordination information is received, the second UE may select or reselect radio resources using at least one of the preferred or non-preferred resource information included in the coordination information and the resource information selected as the sensing result.

When the coordination information includes conflict indication information, the second UE performs a radio resource reselection operation. Further, when the coordination information includes the preferred resource information and/or the non-preferred resource information, the second UE performs radio resource selection or reselection operation as a different operation depending on the resources included, as follows.

As an example, when the coordination information includes the preferred resource information, the second UE may select or reselect the radio resources, commonly included in the sensing result resource information and preferred resource information, as sidelink resources. For example, the second UE may first select or reselect the resources commonly included in the preferred resource information included in the coordination information and the sensing result resource information about the sensing performed before receiving the coordination information. Or, the second UE may perform sensing for selecting radio resources after receiving the coordination information and may first select or reselect the common resources of the corresponding sensing result resource information and the preferred resource information.

As another example, when the coordination information includes the preferred resource information, the second UE may select or reselect the sidelink resources among the radio resources included in the preferred resource information without considering the sensing result resource information. In other words, the second UE may select or reselect the sidelink resources only from among the radio resources included in the preferred resource information without using the sensing result resource information that the second UE itself senses.

As another example, when the coordination information includes the non-preferred resource information, the second UE may select or reselect the sidelink resources while excluding the radio resources included in the non-preferred resource information among the sensing result resource information. The second UE may select or reselect the radio resources from the sensing result resource information that is left after excluding the ones for the case where the sensing result resource information sensed in the sensing window overlaps the radio resources included in the non-preferred resource information.

It is possible to prevent issues due to conflict in radio resources in sidelink communication by the above-described operations of the UE and the second UE.

Various embodiments for addressing the above-described HARQ transmission/reception collision issues and collision issues in use of radio resources in mode 2 are described below. The embodiments described below may be performed by the above-described UE.

First, criteria for determining priority when the transmission and reception of HARQ feedback overlap during inter-vehicle communication may be required. As described above, the priority may be determined considering various factors. For example, the HARQ feedback priority may be determined considering, e.g., cast type, transmission HARQ feedback status, HARQ feedback options, and communication range requirements.

The UE may receive sidelink data from the other UE and transmit sidelink data to the other UE. In this case, HARQ feedback for the received data is transmitted, and HARQ feedback for the transmitted data is received. For each HARQ feedback, feedback information, feedback offset, and feedback radio resources may be determined in various manners, depending on various factors, such as option, cast type, and configuration.

Therefore, the UE's HARQ feedback transmission and reception may overlap over the time resources. In this case, the UE may not properly receive reception signals. Or, the UE may not properly transmit signals.

To address these issues, the disclosure controls the UE's HARQ feedback transmission/reception processing using the priority information about the sidelink data associated with the HARQ feedback as described above.

As an example, the UE may process the HARQ feedback information for sidelink data with higher priority, first, using the priority information about the sidelink data transmitted or received. For example, the sidelink data priority information may be determined by the priority field value of the sidelink control information associated with each data. The UE may compare the priority field values included in the sidelink control information and may prioritize processing of the HARQ feedback for the sidelink data with a smaller priority field value (higher priority).

As another example, the UE may also determine the priority based on the transmission type of the sidelink data transmitted or received. When sidelink data is received through unicast, and sidelink data is transmitted through groupcast, the UE may prioritize processing of HARQ feedback reception based on the preset per-transmission type priorities. Of course, the opposite case is also possible.

As another example, the UE may also determine the priority based on, e.g., the HARQ option set in association with the transmission/reception sidelink data, whether the HARQ feedback includes NACK information, and HARQ feedback transmission format.

An example of determining the priority using the transmission type (cast type) is described. The priority may be determined considering the above-described factors in the same or similar manner.

When the cast types of the HARQ feedback to be transmitted and the HARQ feedback to be received are unicast The HARQ feedback to be transmitted, and HARQ feedback to be received, by the UE in the overlapping time periods may be set as the same transmission type. In this case, although the priority is set to be determined based on the transmission types, it is required to provide an additional criterion because the transmission types are the same transmission type.

In this case, the UE may perform reception of the sidelink feedback channel (physical sidelink feedback channel (PSFCH) including HARQ feedback prior to transmission of the PSFCH. In other words, when the cast types of the HARQ feedback to be transmitted and the HARQ feedback to be received, both, are unicast, the UE may be configured to perform HARQ feedback reception first.

This is why HARQ feedback transmission may be controlled by the UE, but HARQ feedback reception by the UE may not be identified by the other UE, and thus needs to have higher priority.

When the cast types of the HARQ feedback to be transmitted and the HARQ feedback to be received are different Unicast is typically used for sensor sharing or see-through applications, and groupcast are used for, e.g., platooning applications. In this case, since platooning requires less latency than sensor sharing, the PSFCH may be allocated first to the HARQ feedback used for groupcast.

In other words, the UE may prioritize processing of HARQ feedback for groupcast which is more delay-critical.

Even when priority is determined by comparing the sidelink control information priority field values, the priority field value may be set to have a lower value (higher priority) in groupcast than in unicast.

Accordingly, when transmission of HARQ feedback used for groupcast and reception of HARQ feedback used for unicast both are required, the UE may determine that transmission of PSFCH has priority.

Conversely, when reception of HARQ feedback used for groupcast and transmission of HARQ feedback used for unicast both are required, the UE may determine that reception of PSFCH has priority.

When the cast types of the HARQ feedback to be transmitted and the HARQ to be received are groupcast As an example, the UE may determine priority of transmission and reception of the PSFCH depending on whether the HARQ feedback to be transmitted is ACK or NACK.

Upon succeeding in receiving sidelink data, the UE need not receive the same data again. In other words, when the HARQ feedback to be transmitted by the UE is ACK, the UE need not receive the TB again but, if the HARQ feedback is NACK, the UE need to send an NACK to receive the TB again.

In this case, if the HARQ feedback to be transmitted by the UE is NACK, the UE may be configured to prioritize transmission of the PSFCH as shown in Table 2. In other words, if the HARQ feedback to be transmitted is NACK, the UE may prioritize transmission of HARQ feedback over reception of the PSFCH from the other UE.

If the HARQ feedback to be transmitted by the UE is ACK, the UE may be configured to prioritize reception of the PSFCH. In other words, since a data channel has already been received validly, reception of the PSFCH from the other UE, which is more urgent, may be prioritized.

TABLE 2

| HARQ Tx | HARQ Rx | Priority |
|---|---|---|
| NACK | — | HARQ Tx |
| ACK | — | HARQ Rx |

As another example, the UE may be configured to determine priority of transmission and reception of PSFCH depending on HARQ feedback options.

In vehicle-to-vehicle communication, HARQ feedback options for groupcast are divided into NACK only (option 1) and ACK/NACK (option 2). The NACK only option primarily aims to reduce latency by decreasing HARQ feedback signals. Therefore, it is more delay-critical than option 1.

In this case, the UE may be configured to prioritize PSFCH allocation to the HARQ feedback having the NACK only option over the HARQ feedback having the ACK/NACK option as shown in Table 3. In other words, if the option of the HARQ feedback to be transmitted is NACK only, the UE may prioritize transmission of HARQ feedback over reception of the PSFCH from the other UE.

If the option of the HARQ feedback to be received by the UE is NACK only, the UE may be configured to prioritize reception of the PSFCH.

TABLE 3

| HARQ Tx | HARQ Rx | Priority |
|---|---|---|
| Groupcast option 1 | Groupcast option 2 | HARQ Tx |
| Groupcast option 2 | Groupcast option 1 | HARQ Rx |

As another example, the UE may be configured to determine priority of the transmission and reception of the PSFCH depending on the communication range when using 2nd SCI Format-B.

The sidelink control information (SCI) used in sidelink communication may be transmitted in two steps: 1st SCI and 2nd SCI. In this case, 2nd SCI may be divided into SCI format 2-A and SCI format 2-B.

SCI format 2-A may be used for decoding PSSCH and be used for HARQ operation when the HARQ-ACK information includes ACK or NACK, and when only NACK is included in the HARQ-ACK information or there is no feedback for the HARQ-ACK information.

SCI format 2-A may include information, such as HARQ process number, new data indicator, redundancy version, source ID, destination ID, HARQ feedback enabled/disabled indicator, cast type indicator, and CSI request.

Further, SCI format 2-B may be used for PSSCH decoding and may be used with HARQ operation when only NACK is included in HARQ-ACK information or there is no feedback for HARQ-ACK information.

SCI format 2-B may include information, such as HARQ process number, new data indicator, redundancy version, source ID, destination ID, HARQ feedback enabled/disabled indicator, zone ID, and communication range requirements.

As shown in Table 4, the UE may be configured to prioritize first housing 431 for the data channel where the 2nd SCI uses format 2-B over the HARQ feedback for the data channel using SCI format 2-A. In other words, the SCI format 2-B case may be prioritized over the SCI format 2-A case regardless of transmission and reception of HARQ feedback.

TABLE 4

| HARQ Tx | HARQ Rx | Priority |
|---|---|---|
| $2^{nd}$ SCI Format-A | $2^{nd}$ SCI Format-B | HARQ Rx |
| $2^{nd}$ SCI Format-B | $2^{nd}$ SCI Format-A | HARQ Tx |
| $2^{nd}$ SCI Format-B | $2^{nd}$ SCI Format-B | The shorter the communication range, the higher priority is given for PSFCH allocation |

For example, when the 2nd SCI format of the HARQ feedback to be transmitted is SCI format 2-B, and the 2nd SCI format of the HARQ feedback to be received is SCI format 2-A, the UE may be configured to assign priority to transmission of PSFCH. Likewise, when the $2^{nd}$ SCI format of the HARQ feedback to be transmitted is SCI format 2-A, and the $2^{nd}$ SCI format of the HARQ feedback to be received is SCI format 2-B, the UE may be configured to assign priority to reception of PSFCH. If the $2^{nd}$ SCI formats of the HARQ feedback to be transmitted and the HARQ feedback to be received are SCI format 2-B, the UE may assign priority based on the communication range with the target UE. In other words, the UE may determine that the shorter the communication range, the less latency is required, and prioritize PSFCH allocation to the UE which is in a shorter communication range.

Therefore, when both transmission and reception of HARQ feedback use SCI format 2-B, the UE may perform HARQ feedback processing first on a UE having a shorter communication range to each target UE.

Further, priority may be determined based on various pieces of information described in connection with FIG. 9. An embodiment for preventing radio resource collision using coordination information is described below with reference to FIG. 10.

3GPP Rel-17 supports mode 2, which is vehicle-to-vehicle direct communication (PC5) in 5G V2X. In mode 1, the base station may adjust the resource allocation to each vehicle to avoid resource collisions. However, in mode 2, each vehicle allocates (selects) resources, which may lead to collisions where the allocated resources overlap. To avoid this, a sub-mode may be required where one vehicle assists the other vehicle in resource selection, as described above. That is, an inter-UE coordination protocol is required to coordinate resource allocation by sharing allocated resource information between vehicles. In the background, the present embodiments propose specific inter-user coordination protocol procedures, messages, information, and the like.

Figure 11:
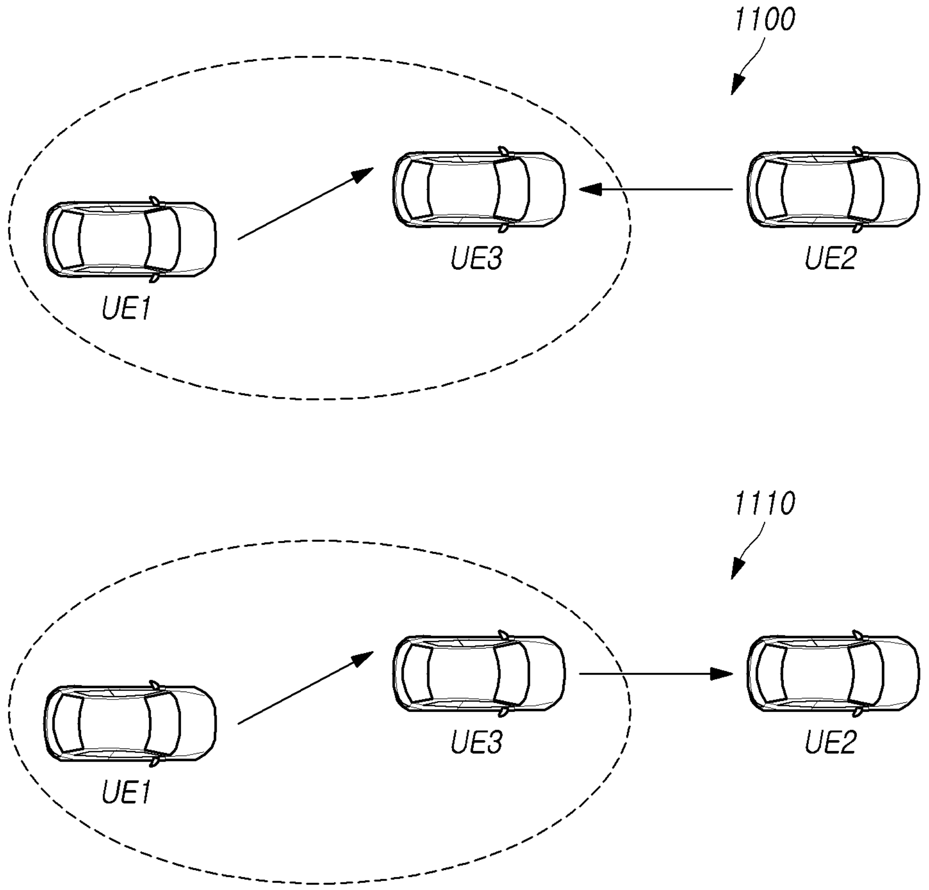
FIG. 11 is a view illustrating a situation where coordination information is required in a sidelink communication operation, according to an embodiment.

FIG. 11 is a view illustrating a situation where coordination information is required in a sidelink communication operation, according to an embodiment.

Referring to FIG. 11, in a sidelink communication, multiple terminals may transmit/receive data. As in the 1100 situation, UE1 and UE2 may perform sidelink communication using mode 2. In this case, UE1 and UE2 are each outside the sensing range for radio resource selection, so they may select the same radio resource. From the perspectives of UE1 and UE2, no conflict occurs in each radio resource selection and data transmission. However, UE3 may receive data from UE1 and UE2. In this case, UE3 receives the sidelink data through the same radio resource, causing a resource conflict issue. As such, an inter-UE coordination procedure may be required to address hidden node issues.

In the 1110 case, UE1 may transmit sidelink data to UE3. UE3 may also transmit sidelink data to UE2. In this case, if UE1 and UE3 select the same sidelink radio resource, UE3 may be unable to receive the data from UE1 due to conflict. To address such a half-duplex problem, an inter-UE coordination procedure may be needed.

To address these issues, the present disclosure proposes to transmit coordination information to lead to the selection or reselection of radio resources, as described above. The coordination information may be transmitted via unicast communication (PC5-RRC) and, as necessary, may also be transmitted in a broadcast or groupcast manner.

Use of coordination information may solve a variety of issues, including persistent resource conflicts, hidden node issues, and half-duplex issues.

For example, the UE may obtain radio resource information that is used or to be used by another UE through sidelink control information (SCI). The UE generates coordination information using the obtained radio resource information of the other UE. The generated coordination information is transmitted to the UE that transmitted the SCI. Alternatively, the UE may select a radio resource to be used considering the other UE's radio resource information.

The coordination information generated by the UE may include any one of conflict indication information, preferred resource information, and non-preferred resource information. The preferred or non-preferred resource information may be determined by the UE and may each include one or more resources. Therefore, the UE itself determines the resource set to configure the preferred or non-preferred resource information. The conflict indication information includes information for indicating when a conflict occurs or a conflict is predicted for the reserved resource reserved by the other UE.

The configured coordination information may be forwarded to the other UE or the UE that transmitted the SCI. To transfer, unicast communication is considered, but broadcast or groupcast may also be adopted. Further, various embodiments may also be possible for the operations of the UE receiving the coordination information and the transmission timings.

First, an embodiment related to the operation of transmitting coordination information is described.

Figure 12:
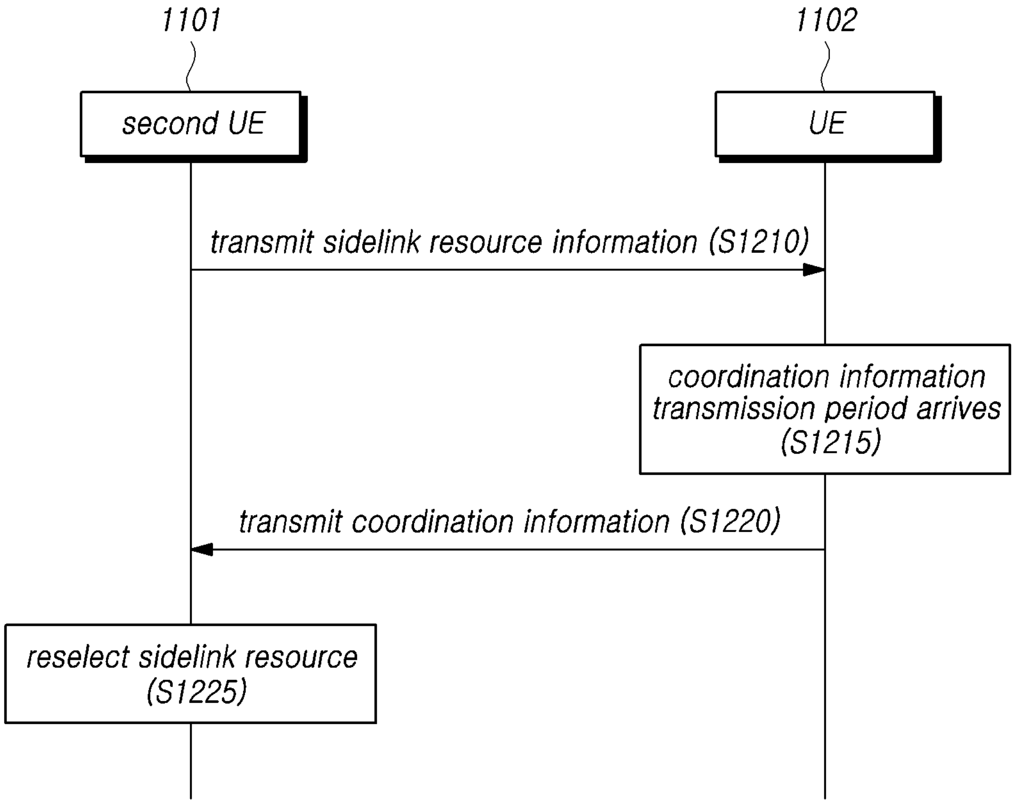
FIG. 12 is a view illustrating periodic coordination information transmission according to an embodiment.

FIG. 12 is a view illustrating periodic coordination information transmission according to an embodiment.

Referring to FIG. 12, the second UE 1101 may transmit sidelink resource information for sidelink data transmission through the SCI (S1210). The sidelink resource information may include sidelink reserved resource information to be used by the second UE. The sidelink resource information may be included in at least one of the sidelink control channel (PSCCH) and the sidelink data channel (PSSCH). The SCI may be transmitted not only through a sidelink control channel but also through a sidelink data channel.

The UE 1102 may monitor the SCI to identify the sidelink resource information of the second UE 1101. Further, the UE 1102 may monitor the sidelink resource information from the other UE and identify it.

The UE 1102 may periodically transmit the coordination information. In this case, the UE 1102 identifies whether the transmission period of the coordination information arrives (S1215). If the transmission period for coordination information arrives, the UE 1102 may transmit the coordination information (S1220). In this case, the coordination information is transmitted to the second UE 1101 through unicast communication. Or, the coordination information may be transmitted to the other UE through multicast or broadcast. The coordination information is transmitted through at least one of the PSCCH and the PSSCH. Further, the coordination information includes preferred resource information or non-preferred resource information as described above.

The second UE 1101 performs the operation of reselecting the sidelink resource using at least one of the received coordination information and the sensing result value that it has sensed on its own (S1225). Upon reselecting the sidelink resource, the second UE 1101 may perform distinct operations depending on whether the coordination information includes the preferred resource information or the non-preferred resource information.

As an example, if the preferred resource information is included, the second UE 1101 may select the common resources among the resources selected as the sensing result and the preferred resource information, as the sidelink resources.

As another example, if the preferred resource information is included, the second UE 1101 may select the sidelink resources in the preferred resource information using only the preferred resource information. In this case, the resource that has the highest sensing result value in the preferred resource information may be selected.

As another example, if the non-preferred resource information is included, the second UE 1101 may select sidelink resources while excluding the common resources in the non-preferred resource information and the resources selected as the sensing result.

Figure 13:
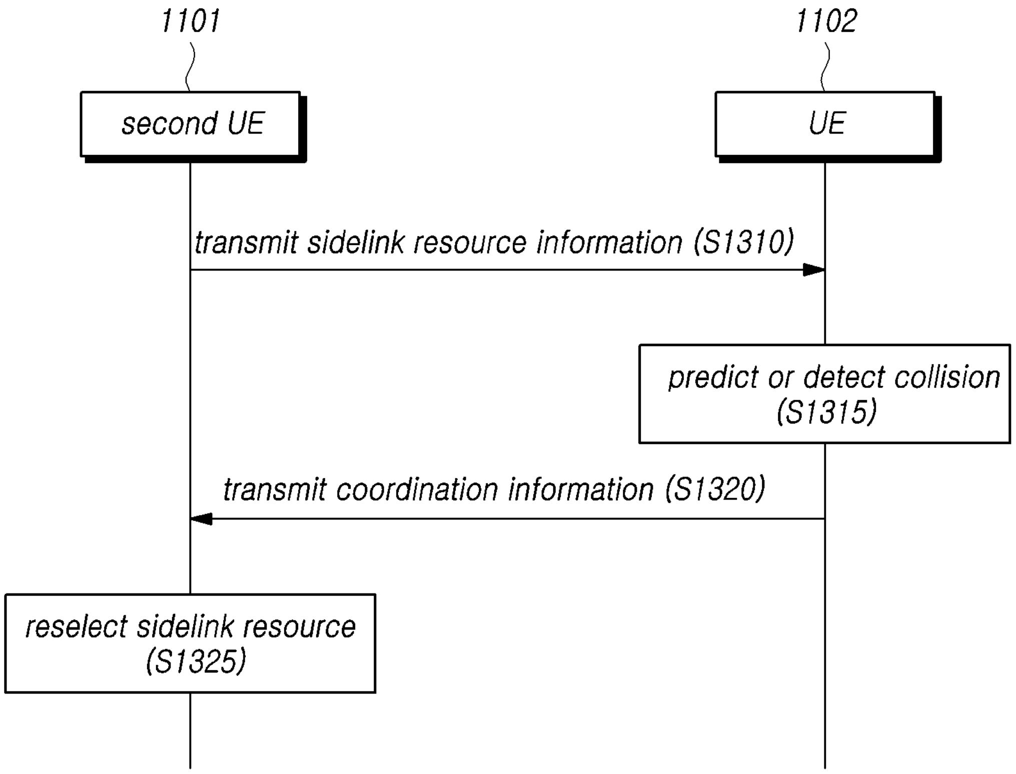
FIG. 13 is a view illustrating coordination information transmission according to conflict prediction, according to another embodiment.

FIG. 13 is a view illustrating coordination information transmission according to conflict prediction, according to another embodiment.

Referring to FIG. 13, unlike FIG. 12, coordination information may be transmitted if a specific context occurs, rather than being periodically transmitted.

The second UE 1101 may transmit sidelink resource information for sidelink data transmission through the SCI (S1310). The sidelink resource information may include sidelink reserved resource information to be used by the second UE 1101. The sidelink resource information may be included in at least one of the sidelink control channel (PSCCH) and the sidelink data channel (PSSCH). The SCI may be transmitted not only through a sidelink control channel but also through a sidelink data channel.

The UE 1102 may monitor the SCI to identify the sidelink resource information of the second UE 1101. Further, the UE 1102 may monitor the sidelink resource information from the other UE and identify it.

The UE 1102 determines whether collision occurs or is predicted by comparing the sidelink resource information of the second UE 1101 and the sidelink resource information of the other UE (S1315).

If collision occurs or is predicted, the UE 1102 transmits the coordination information (S1320). In this case, coordination information may be transmitted only when a preset proportion of, or a preset number of, resources or more collide. Or, if one resource collides or collision is predicted, the coordination information may be transmitted. Or, coordination information may be transmitted only when all the resources collide or are predicted to collide. The coordination information is transmitted through at least one of the PSCCH and the PSSCH. Further, the coordination information may include collision indication information as described above.

The second UE 1101 performs the operation of reselecting the sidelink resource using at least one of the received coordination information and the sensing result value that it has sensed on its own (S1325). The second UE 1101 may perform the sensing operation for radio resource reselection when the collision indication information included in the coordination information indicates collision.

Or, if the preferred resource information is included in the coordination information, the second UE 1101 may select the common resources among the resources selected as the sensing result and the preferred resource information, as the sidelink resources.

As another example, if the preferred resource information is included in the coordination information, the second UE 1101 may select the sidelink resources in the preferred resource information using only the preferred resource information. In this case, the resource that has the highest sensing result value in the preferred resource information may be selected.

As another example, if the non-preferred resource information is included in the coordination information, the second UE 1101 may select sidelink resources while excluding the common resources in the non-preferred resource information and the resources selected as the sensing result.

Figure 14:
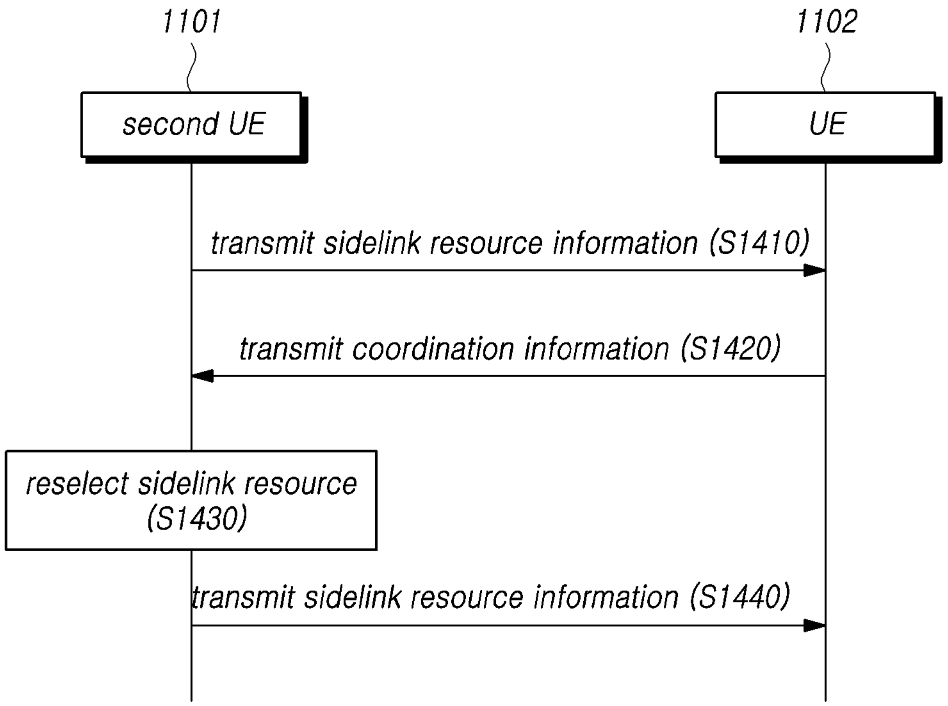
FIG. 14 is a view illustrating sidelink resource reselection using coordination information according to another embodiment.

FIG. 14 is a view illustrating sidelink resource reselection using coordination information according to another embodiment.

Referring to FIG. 14, the second UE 1101 may transmit sidelink resource information for sidelink data transmission through the SCI (S1410). The sidelink resource information may include sidelink reserved resource information to be used by the second UE. The sidelink resource information may be included in at least one of the sidelink control channel (PSCCH) and the sidelink data channel (PSSCH). The SCI may be transmitted not only through a sidelink control channel but also through a sidelink data channel.

The UE 1102 may monitor the SCI to identify the sidelink resource information of the second UE 1101. Further, the UE 1102 may monitor the sidelink resource information from the other UE and identify it.

The UE 1102 may transmit the coordination information to the second UE 1101 (S1420). The transmission of the coordination information may be caused periodically or due to an occurrence of an event, such as collision prediction, as described above. Or, coordination information transmission may be caused by various factors as described in connection with FIG. 10. The coordination information is transmitted through at least one of the PSCCH and the PSSCH. Further, the coordination information includes collision indication information, preferred resource information or non-preferred resource information as described above.

The second UE 1101 performs the operation of reselecting the sidelink resource using at least one of the received coordination information and the sensing result value that it has sensed on its own (S1430). Upon reselecting the sidelink resource, the second UE 1101 may perform distinct operations depending on whether the coordination information includes the preferred resource information or the non-preferred resource information.

As an example, if the preferred resource information is included, the second UE 1101 may select the common resources among the resources selected as the sensing result and the preferred resource information, as the sidelink resources.

As another example, if the preferred resource information is included, the second UE 1101 may select the sidelink resources in the preferred resource information using only the preferred resource information. In this case, the resource that has the highest sensing result value in the preferred resource information may be selected.

As another example, if the non-preferred resource information is included, the second UE 1101 may select sidelink resources while excluding the common resources in the non-preferred resource information and the resources selected as the sensing result.

The second UE 1101 reselects the sidelink resource and transmits the sidelink control information, indicating it, back to the UE 1102 (S1440). By such operation, the UE 1102 may prevent the issues described in connection with FIG. 10.

Further, such operation may likewise apply even where the second UE 1101 operates as the UE 1102 to communicate with the other UE.

The operations related to transmission of coordination information described above may be indicated for activation or deactivation by the base station. In this case, the UE may, or may not, perform the coordination information transmission operation depending on the activation and deactivation instructions.

The configuration of the UE described above is described again below with reference to the drawings.

Figure 15:
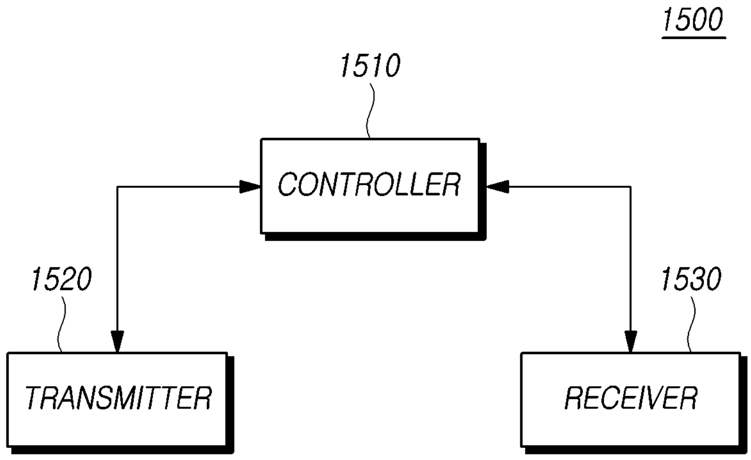
FIG. 15 is a view illustrating a configuration of a UE according to an embodiment.

FIG. 15 is a view illustrating a configuration of a UE according to an embodiment.

Referring to FIG. 15, a UE 1500 controlling sidelink communication may include a receiver 1530 receiving sidelink control information from a second UE and receiving first sidelink data according to scheduling of the sidelink control information and a controller 1510 determining priority when a time resource for transmission of first HARQ feedback information for the first sidelink data and a time resource for receiving second HARQ feedback information for second sidelink data transmitted by the UE at least partially overlap.

Further, a UE 1500 controlling sidelink communication may include a receiver 1530 that receives sidelink control information including sidelink reserved resource information from a second UE, a controller 1510 determining whether to transmit the coordination information, and a transmitter 1520 that transmits coordination information including any one of collision indication information, preferred resource information, and non-preferred resource information to a second UE if transmission of the coordination information is determined.

For example, the sidelink control information may be transmitted through PSCCH and PSSCH. The sidelink control information may include various pieces of information, such as reserved radio resource information, scheduling information, and priority information, in the respective fields.

Upon receiving the sidelink control information, the receiver 1530 may receive the sidelink data in the radio resource indicated by the sidelink control information. The sidelink data may be received through the PSSCH.

The controller 1510 needs to determine the priority so that when the time resources of the first HARQ feedback transmission and the second HARQ feedback reception overlap, either operation is performed.

For example, the controller 1510 may determine the priority based on the transmission types of the first sidelink data and the second sidelink data. Here, the transmission types may be divided into a unicast type, a group cast type, and a broadcast type. For example, the controller 1510 may determine that if the first sidelink data is received through unicast and the second sidelink data is transmitted through groupcast, the first HARQ feedback transmission for the first sidelink data transmitted in the unicast type is prioritized. Of course, the opposite case is also possible.

As another example, the controller 1510 may determine the priority based on a result of comparison between the respective pieces of priority information of the first sidelink data and the second sidelink data. The controller 1510 may control to prioritize processing of HARQ feedback for higher-priority data. For example, the priority information may be determined by the priority field value included in sidelink control information associated with each of the first sidelink data and the second sidelink data. In other words, priority information may be determined by the priority field value included in the sidelink control information, and the corresponding priority field value is applied to the sidelink data scheduled by the sidelink control information. The controller 1510 may identify and compare the priority field values associated with two sidelink data, and prioritize processing of the HARQ feedback information associated with the sidelink data having the lower value.

The priority field value may be determined considering various factors. For example, the priority field value may be determined based on the service type of the corresponding sidelink data. Or, the priority field value may be determined based on the transmission types of the first sidelink data and the second sidelink data.

As another example, when the respective pieces of priority information about the first sidelink data and the second sidelink data indicate the same priority, the controller 1510 may determine the priority based on any one of the HARQ option type information about each of the first HARQ feedback information and the second HARQ feedback information, the type of information included in the first HARQ feedback, and the format of the sidelink control information.

For example, when the same priority field value is set, the controller 1510 may determine the priority based on the HARQ feedback option type information set in each sidelink data. For example, the option type set to transmit the HARQ only in the case of a NACK may be determined to be higher in priority than the option type set to be fed back in the case of an ACK/NACK.

Or, when an NACK is included in the HARQ feedback information, it may be determined to prioritize transmission of HARQ feedback information over reception of HARQ feedback information. Or, the priority may be determined based on the transmission channel format of the sidelink control information.

Meanwhile, the sidelink reserved resource information may be included and transmitted in the sidelink control information.

The receiver 1530 may receive the sidelink reserved resource information transmitted from the second terminal via at least one of the above-described PSCCH and PSSCH channels. The sidelink reserved resource information may include at least one piece of radio resource information.

The controller 1510 may determine whether it is necessary to transmit coordination information to prevent radio resource conflict.

As an example, the controller 1510 may determine that transmission of the coordination information is required when request information requesting the coordination information is received from the second terminal. The request information may be included and received in the above-described sidelink control information. In this case, the coordination information may include at least one of the preferred resource information and the non-preferred resource information.

As another example, the controller 1510 may determine that transmission of the coordination information is necessary if the radio resources indicated by the sidelink reserved resource information transmitted by the second terminal at least partially overlap the sidelink reserved resource information reserved by at least one other terminal and received by the terminal. In this case, the coordination information may include collision indication information.

For example, the receiver 1530 may receive sideline reserved resource information transmitted by the second terminal as well as at least one other terminal. In this case, the controller 1510 determines whether the reserved resources of the second terminal and the other terminal overlap by using the sidelink reserved resource information transmitted by the second terminal and the sidelink reserved resource information transmitted by the other terminal. When all or some overlap, the controller 1410 may determine that it is necessary to send coordination information.

As another example, the controller 1510 may use the result of comparison between the sidelink reserved resource information transmitted by the second terminal and the sidelink radio resource already used for communication by the other terminal. In other words, the terminal may determine to transmit coordination information when the reserved resources of the second terminal at least partially overlap the radio resources being used by the other terminal.

Besides, the controller 1510 may determine to periodically transmit coordination information based on a preset period. Alternatively, the controller 1510 may determine to transmit the coordination information when a preset event condition is met.

Meanwhile, the preferred resource information may include information about radio resources that the terminal prefers to be used by the second terminal. The non-preferred resource information may include information about radio resources that the terminal does not expect to be used by the second terminal.

As an example, the preferred resource information included in the coordination information may include at least one radio resource selected based on the sidelink reserved resource information reserved by at least one other terminal, received by the terminal. For example, when the terminal includes and transmits the preferred resource information in the coordination information, the controller 1510 may select the preferred resource information based on the sidelink reserved resource information about the other terminal. Specifically, at least one selected radio resource included in the preferred resource information may be configured to exclude the sidelink reserved resource information having an RSRP measurement value larger than a preset threshold from the sidelink reserved resource information reserved by at least one other transmission UE. The controller 1510 may measure the RSRP for each of at least one radio resource included in the sidelink reserved resource information received from at least one other transmission UE. The controller 1510 compares the RSRP value measured for each of at least one radio resource and a preset RSRP threshold. Thereafter, the controller 1410 configures the preferred resource information so that the reserved resources exceeding the threshold among the reserved resources of the other UE are not included in the preferred resource information.

As another example, the non-preferred resource information included in the coordination information may include the sidelink reserved resource information reserved by at least one other UE and at least one radio resource determined based on the RSRP measurement value measured by the UE. For example, the non-preferred resource information may be determined based on the RSRP measurement value for at least one radio resource included in the sidelink reserved resource information reserved by the other UE. Similar to the preferred resource information, the controller 1410 may include the reserved resource having a predetermined level of RSRP measurement value or more in the non-preferred resource information. Or, the controller 1510 may also include the reserved resource reserved by the other UE and the radio resource having the predetermined level of RSRP measurement value or more measured by the UE in the non-preferred resource information.

Meanwhile, the transmitter 1520 may include and transmit the coordination information in the sidelink control information. As described above, the coordination information may be transmitted through at least one of the PSCCH and PSSCH channels. Or, the coordination information may be transmitted through broadcast or groupcast.

Meanwhile, the coordination information may include a different value depending on the cause of the determination of transmitting the coordination information. For example, when the coordination information is transmitted according to reception of request information from the second UE or transmitted by periodic transmission, the coordination information includes at least one of the preferred resource information and the non-preferred resource information. In contrast, if the coordination information is transmitted when the second UE's sidelink reserved resource information conflicts or is predicted to conflict, the coordination information includes only conflict indication information.

Meanwhile, upon receiving the coordination information, the second UE selects or reselects radio resources for sidelink communication.

As an example, when the coordination information includes the preferred resource information, the second UE may select or reselect the radio resources, commonly included in the sensing result resource information and preferred resource information, as sidelink resources. For example, the second UE may first select or reselect the resources commonly included in the preferred resource information included in the coordination information and the sensing result resource information about the sensing performed before receiving the coordination information. Or, the second UE may perform sensing for selecting radio resources after receiving the coordination information and may first select or reselect the common resources of the corresponding sensing result resource information and the preferred resource information.

As another example, when the coordination information includes the preferred resource information, the second UE may select or reselect the sidelink resources among the radio resources included in the preferred resource information without considering the sensing result resource information. In other words, the second UE may select or reselect the sidelink resources only from among the radio resources included in the preferred resource information without using the sensing result resource information that the second UE itself senses.

As another example, when the coordination information includes the non-preferred resource information, the second UE may select or reselect the sidelink resources while excluding the radio resources included in the non-preferred resource information among the sensing result resource information. The second UE may select or reselect the radio resources from the sensing result resource information that is left after excluding the ones for the case where the sensing result resource information sensed in the sensing window overlaps the radio resources included in the non-preferred resource information.

As another example, if the coordination information includes the collision indication information, and the collision indication information indicates collision, the second UE may reselect radio resources using the sensing result resource information sensed in the sensing window.

Besides, the controller 1510 may control the operation of the UE 1400 required to perform the above-described embodiments.

Further, the transmitter 1520 and the receiver 1530 transmit/receive signals, data, and messages with the base station and another UE through a corresponding channel.

The above-described embodiments may be supported by the standard documents disclosed in IEEE 802, 3GPP, and 3GPP2 which are radio access systems. In other words, steps, components, and parts not described to clarify the technical spirit in the embodiments may be supported by the above-described standard documents. Further, all the terms disclosed in the disclosure may be described by the standard documents disclosed above.

The present embodiments described above may be implemented through various means. For example, the present embodiments may be implemented by various means, e.g., hardware, firmware, software, or a combination thereof.

When implemented in hardware, the method according to the present embodiments may be implemented by, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, the method according to the present embodiments may be implemented in the form of a device, procedure, or function performing the above-described functions or operations. The software code may be stored in a memory unit and driven by a processor. The memory unit may be positioned inside or outside the processor to exchange data with the processor by various known means.

The above-described terms, such as "system," "processor," "controller," "component," "module," "interface," "model," or "unit," described above may generally refer to computer-related entity hardware, a combination of hardware and software, software, or software being executed. For example, the above-described components may be, but are not limited to, processes driven by a processor, processors, controllers, control processors, entities, execution threads, programs, and/or computers. For example, both an application being executed by a controller or a processor and the controller or the processor may be the components. One or more components may reside within a process and/or thread of execution, and the components may be positioned in one device (e.g., a system, a computing device, etc.) or distributed in two or more devices.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the disclosure should be construed by the following claims, and all technical spirits within equivalents thereof should be interpreted to belong to the scope of the disclosure.

The invention claimed is:

1. A method for controlling sidelink communication by a UE, comprising:

receiving sidelink control information from a second UE;

receiving first sidelink data according to scheduling of the sidelink control information; and determining priority when a time resource for transmitting first HARQ feedback information for the first sidelink data and a time resource for receiving second HARQ feedback information for second sidelink data transmitted by the UE at least partially overlap, wherein the sidelink control information further includes sidelink reserved resource information, wherein the method further comprises:

before receiving the first sidelink data, determining whether to transmit coordination information; and when transmission of the coordination information is determined, transmitting the coordination information to the second UE, wherein the coordination information is configured based on the following triggers:

when the coordination information is triggered by receiving request information from the second UE, the coordination information includes any one of preferred resource information and non-preferred resource information; and when the coordination information is triggered by detecting a conflict or a predicted conflict between the sidelink reserved resource information of the second UE and another sidelink reserved resource information, the coordination information includes collision indication information without including the preferred resource information and the non-preferred resource information, and wherein the preferred resource information is configured by:

measuring Reference Signal Received Power (RSRP) for each of at least one radio resource included in sidelink reserved resource information received from at least one other UE; and excluding radio resources having an RSRP measurement value larger than a preset threshold from the preferred resource information.

2. The method of claim 1, wherein the priority is determined based on a transmission type of the first sidelink data and the second sidelink data, herein the transmission type comprises at least one of a unicast type and a groupcast type.

3. The method of claim 1, wherein the priority is determined based on a result of comparison between respective priority information of the first sidelink data and the second sidelink data.

4. The method of claim 3, wherein the respective priority information is determined by a priority field value included in sidelink control information associated with each of the first sidelink data and the second sidelink data.

5. The method of claim 4, wherein the priority field value is determined based on a transmission type of the first sidelink data and the second sidelink data, and wherein the transmission type is any one of a unicast type, a groupcast type, and a broadcast type.

6. The method of claim 3, wherein when the respective priority information of the first sidelink data and the second sidelink data indicates the same priority, determining the priority determines the priority based on any one of HARQ option type information of each of the first HARQ feedback information and the second HARQ feedback information, a type of information included in the first HARQ feedback information, and a format type of a sidelink control channel.

7. The method of claim 1, wherein the non-preferred resource information included in the coordination information includes at least one radio resource determined based on an RSRP measurement value measured by the UE and the sidelink reserved resource information reserved by at least one other UE, received by the UE, wherein the non-preferred resource information is determined by merging:

the sidelink reserved resource information reserved by at least one other UE having an RSRP measurement value larger than the preset threshold; and at least one radio resource having an RSRP measurement value larger than the preset threshold measured by the UE.

8. A UE controlling sidelink communication, comprising:

a receiver receiving sidelink control information from a second UE and receiving first sidelink data according to scheduling of the sidelink control information; and a controller determining priority when a time resource for transmitting first HARQ feedback information for the first sidelink data and a time resource for receiving second HARQ feedback information for second sidelink data transmitted by the UE at least partially overlap, wherein the sidelink control information further includes sidelink reserved resource information, wherein before receiving the first sidelink data, the controller determines whether to transmit coordination information, wherein the UE further comprises a transmitter, when transmission of the coordination information is determined, transmitting the coordination information including any one of collision indication information, preferred resource information, and non-preferred resource information to the second UE, wherein the coordination information includes the preferred resource information or the non-preferred resource information when the coordination information is transmitted according to reception of request information from the second UE, and wherein the coordination information includes the collision indication information when sidelink reserved resource information of the second UE conflicts or is predicted to conflict with another sidelink reserved resource information, wherein the controller configures the coordination information based on the following triggers:

when the coordination information is triggered by receiving request information from the second UE, the controller includes any one of preferred resource information and non-preferred resource information in the coordination information; and when the coordination information is triggered by detecting a conflict or a predicted conflict between the sidelink reserved resource information of the second UE and another sidelink reserved resource information, the controller includes collision indication information without including the preferred resource information and the non-preferred resource information in the coordination information, wherein the controller configures the preferred resource information by:

measuring Reference Signal Received Power (RSRP) for each of at least one radio resource included in sidelink reserved resource information received from at least one other UE; and excluding radio resources having an RSRP measurement value larger than a preset threshold from the preferred resource information.

9. The UE of claim 8, wherein the controller determines the priority based on a transmission type of the first sidelink data and the second sidelink data.

10. The UE of claim 8, wherein the controller determines the priority based on a result of comparison between respective priority information of the first sidelink data and the second sidelink data.

* * * * *